(12) United States Patent
Seo et al.

(10) Patent No.: US 12,421,432 B2
(45) Date of Patent: Sep. 23, 2025

(54) ADHESIVE COMPOSITION AND METHOD FOR PREPARING SAME

(71) Applicant: KOREA ADVANCED INSTITUTE OF SCIENCE AND TECHNOLOGY, Daejeon (KR)

(72) Inventors: Myungeun Seo, Daejeon (KR); Jongmin Park, Daejeon (KR); Eunsook Park, Daejeon (KR); Haeshin Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 534 days.

(21) Appl. No.: 17/889,513

(22) Filed: Aug. 17, 2022

(65) Prior Publication Data

US 2023/0081494 A1 Mar. 16, 2023

(30) Foreign Application Priority Data

Sep. 3, 2021 (KR) .................. 10-2021-0117858
Jun. 29, 2022 (KR) .................. 10-2022-0079922

(51) Int. Cl.
| | | |
|---|---|---|
| C09J 167/04 | (2006.01) | |
| C08G 63/664 | (2006.01) | |
| C08K 5/1545 | (2006.01) | |
| C09J 11/06 | (2006.01) | |

(52) U.S. Cl.
CPC .......... *C09J 167/04* (2013.01); *C08G 63/664* (2013.01); *C08K 5/1545* (2013.01); *C09J 11/06* (2013.01)

(58) Field of Classification Search
CPC ....... C09J 167/04; C09J 11/06; C08G 63/664; C08K 5/1545
USPC .......................................................... 524/72
See application file for complete search history.

(56) References Cited

U.S. PATENT DOCUMENTS

2006/0134177 A1* 6/2006 Liu .................. A61L 27/34
556/400
2012/0064061 A1 3/2012 Lee et al.
2014/0148532 A1 5/2014 Omura

FOREIGN PATENT DOCUMENTS

| KR | 10-2012-0028175 | 3/2012 |
|---|---|---|
| KR | 10-2013-0055847 | 5/2013 |
| KR | 10-2017-0103368 | 9/2017 |
| KR | 10-2019-0022359 | 3/2019 |
| KR | 10-2019-0099707 | 8/2019 |
| KR | 10-2021-0107075 | 8/2021 |
| WO | 2012-036442 | 3/2012 |
| WO | 2020136531 | 7/2020 |
| WO | 2020202926 | 10/2020 |
| WO | 2021-081241 | 4/2021 |

OTHER PUBLICATIONS

Keumyeon Kim et al., "TAPE: A Medical Adhesive Inspired by a Ubiquitous Compound in Plants", Adv. Funct. Mater. 2015, 25, 2402-2410, DOI: 10.1002/adfm.201500034.
Hyeon Gyun Nam et al., "Hydrogen bonding-based strongly adhesive coacervate hydrogels synthesized using poly(N-vinylpyrrolidone) and tannic acid", Soft Mttaer 2019, 15, 785-791, DOI: 10.1039/c8sm02144a.
Dongfei Zhang et al., "Fabrication of strong hydrogen-bonding induced coacervate adhesive hydrogels with antibacterial and hemostatic activities", Biomater. Sci., 2020, 8, 1455-1463, DOI: 10.1039/c9bm02029b.
Daiheon Lee et al., "VATA: A Poly(vinyl alcohol)- and Tannic Acid-Based Nontoxic Underwater Adhesive", ACS Appl. Mater. Interfaces 2020, 12, 20933-20941, Apr. 1, 2020.
Hailong Fan et al., "Supramolecular Hydrogel Formation Based on Tannic Acid", Macromolecules 2017, 50, 666-676, Jan. 6, 2017.
Chen Chen et al., "Synthesis and characterization of tannic acid-PEG hydrogel via Mitsunobu polymerization", RCS Advances, 2020, 10, pp. 1724-1732, Doi: 10.1039/c9ra09229c.
Bin Li et al., "Reversible Bioadhesives Using Tannic Acid Primed Thermally-Responsive Polymers", Adv. Funct. Mater, 2020, vol. 30, 1707478, DOI: 10.1002/adfm.201907478.
Yawei Sun et al., "Hierarchical Cross-Linked Poly(caprolactone-co-urethane) toward Connective Tissue-like Properties and Multifunctional Integration", Chem. Mater. 2019, 31, 9295-9306, Oct. 31, 2019.
Quoc Dat Dang et al., "Supramolecular adhesive gels based on biocompatible poly(2-ethyl-2-oxazoline) and tannic acid via hydrogen bonding complexation", Journal of Applied. Polymer Science, 2020, 48285, DOI: 10.1002/app.48285.
Hailong Fan et al., "Tannic Acid-Based Multifunctional Hydrogels with Facile Adjustable Adhesion and Cohesion Contributed by Polyphenol Supramolecular Chemistry", ACS Omega 2017, 2, 6668-6676, Oct. 12, 2017.

\* cited by examiner

*Primary Examiner* — Deve V Hall
(74) *Attorney, Agent, or Firm* — LEX IP MEISTER, PLLC

(57) ABSTRACT

The present disclosure relates to an adhesive composition and a method for preparing the same, and more particularly, to an adhesive composition having high biodegradability and excellent mechanical properties while being biocompatible, and a method for preparing the same.

18 Claims, 35 Drawing Sheets

[FIG. 1]
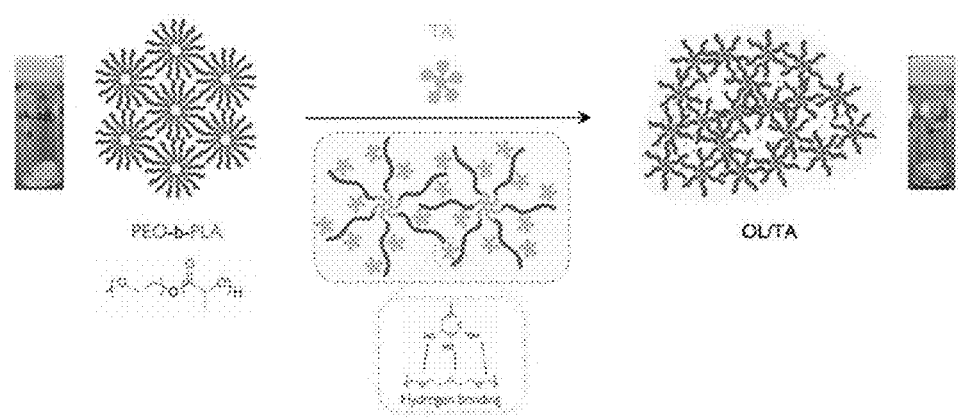

[FIG. 2(a)]
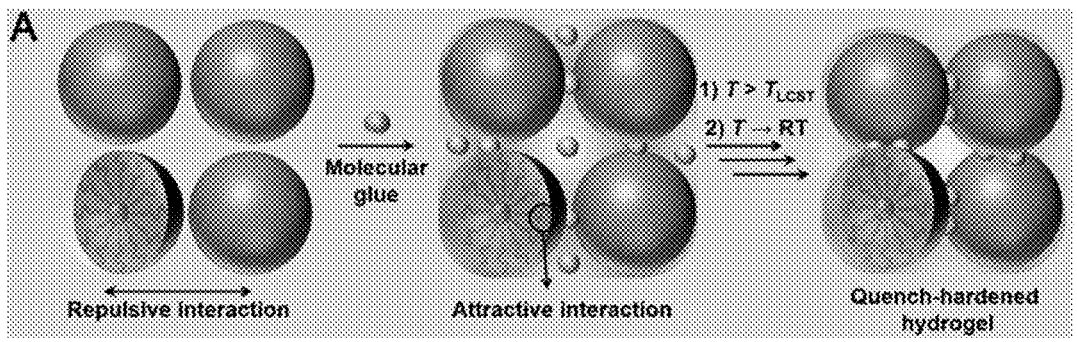
[FIG. 2(b)]
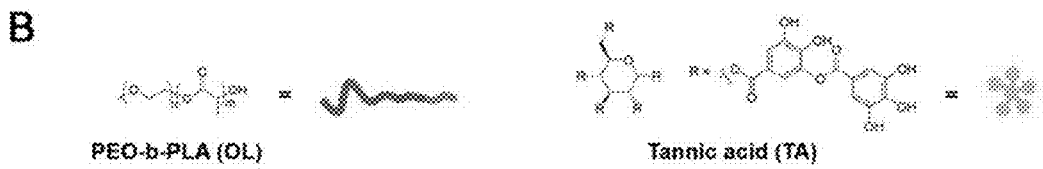
[FIG. 2(c)]
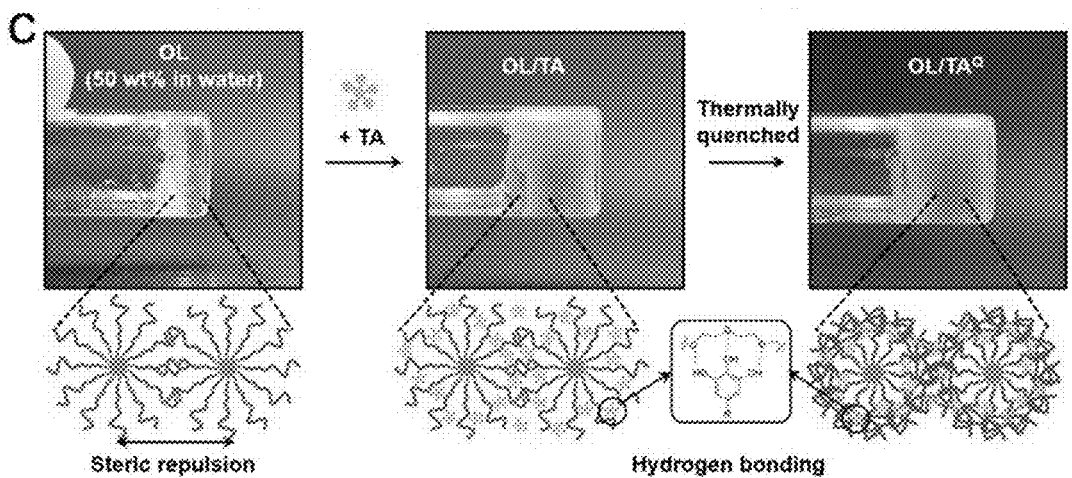
[FIG. 2(d)]
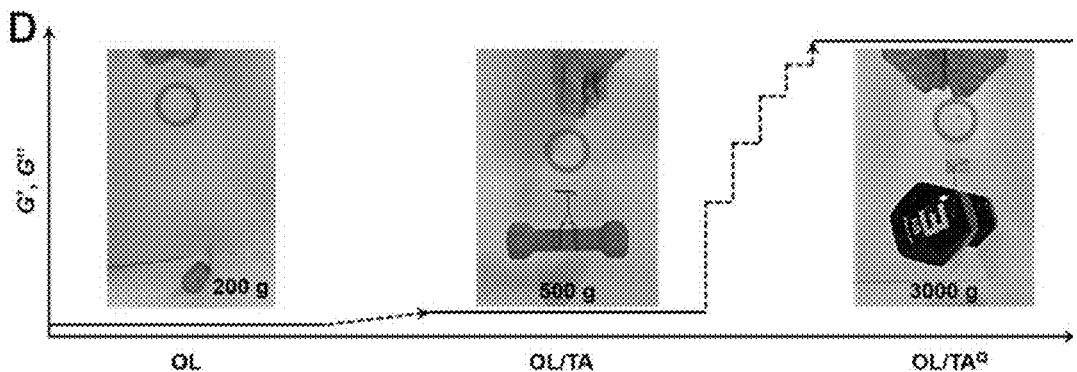

[FIG. 3(a)]
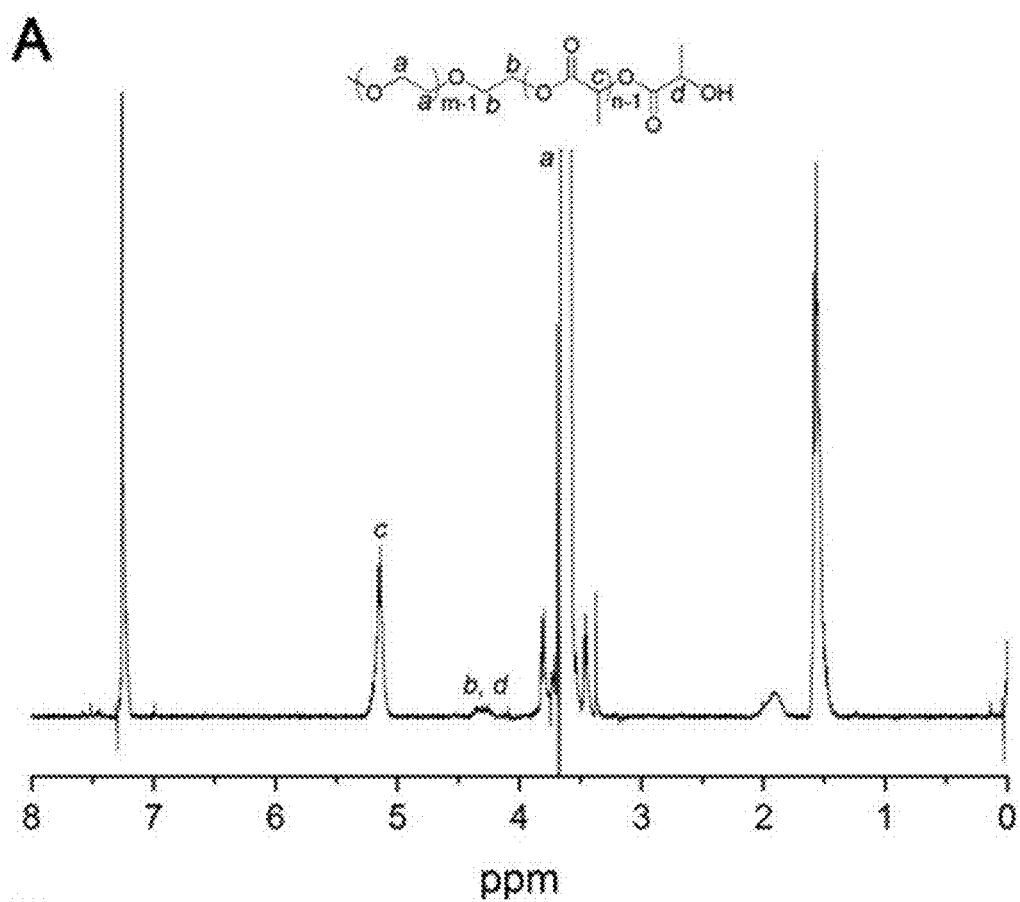

[FIG. 3(b)]
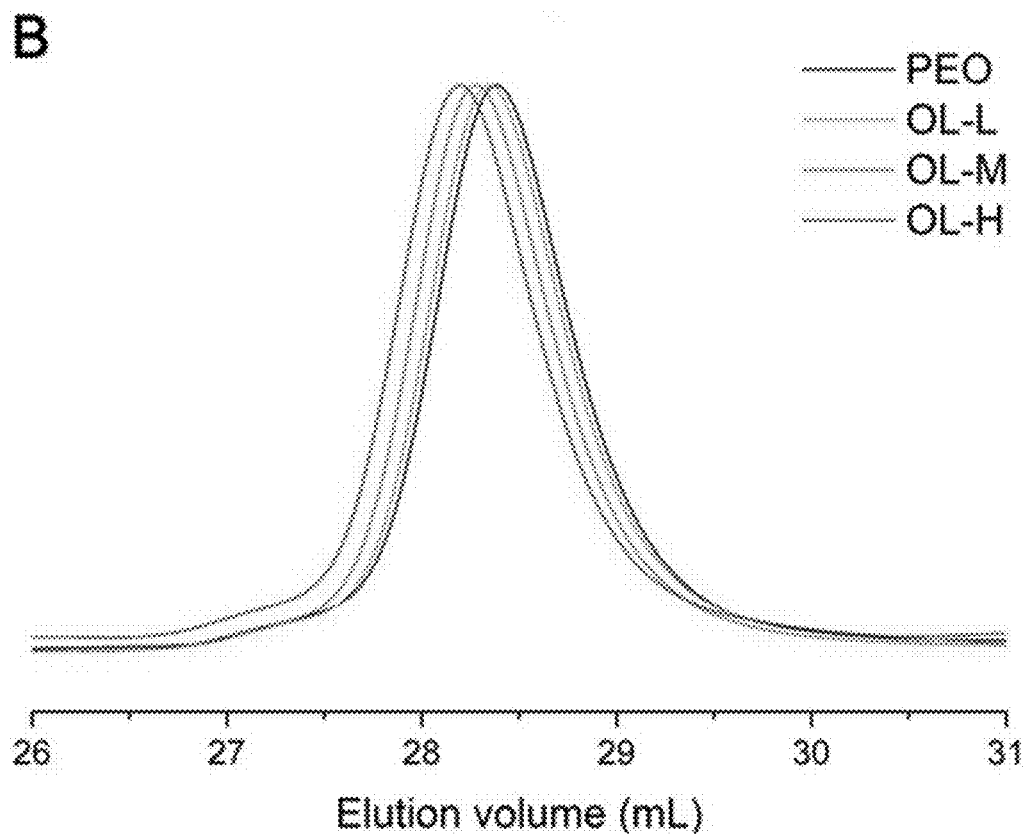

[FIG. 4(a)]
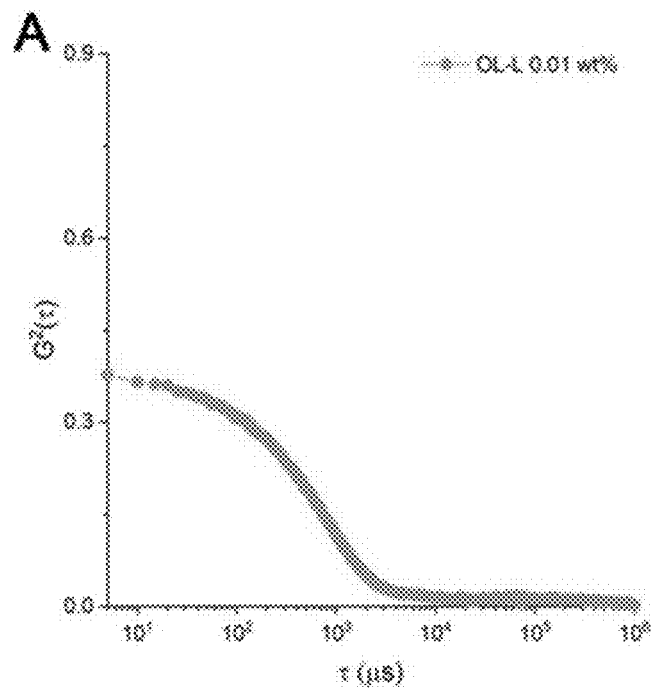
[FIG. 4(b)]
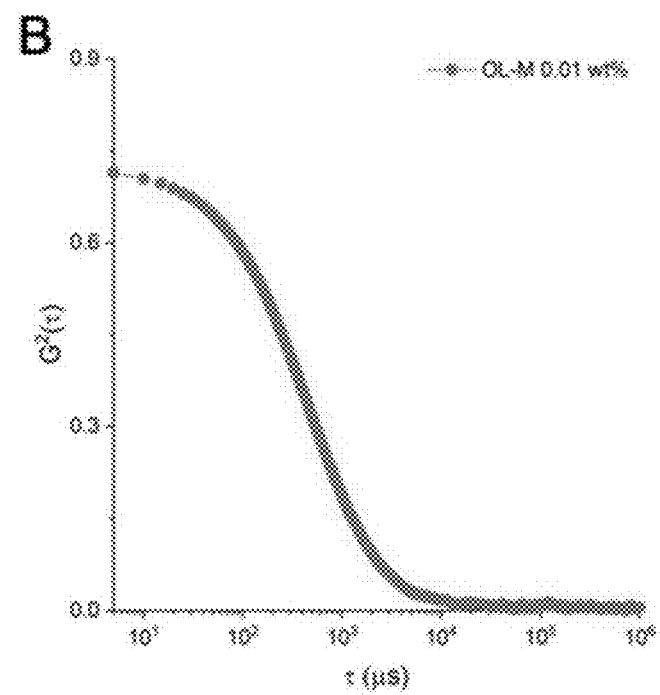

[FIG. 4(c)]
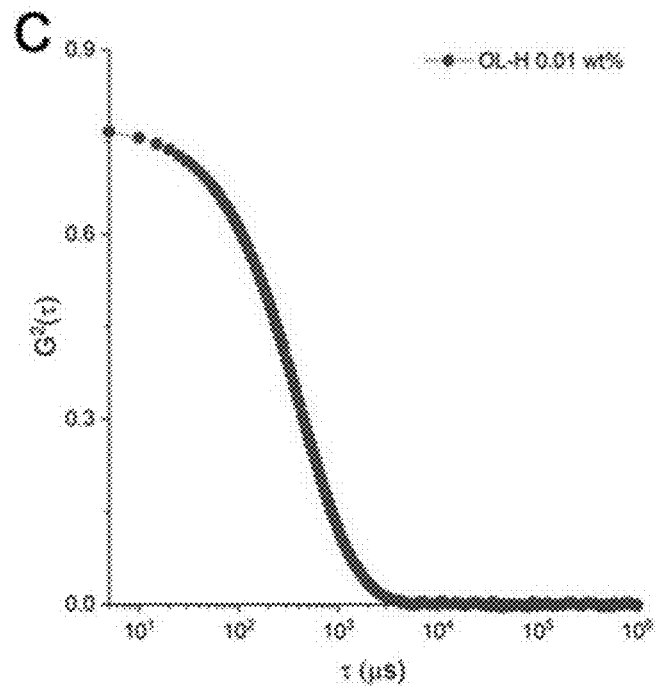
[FIG. 4(d)]
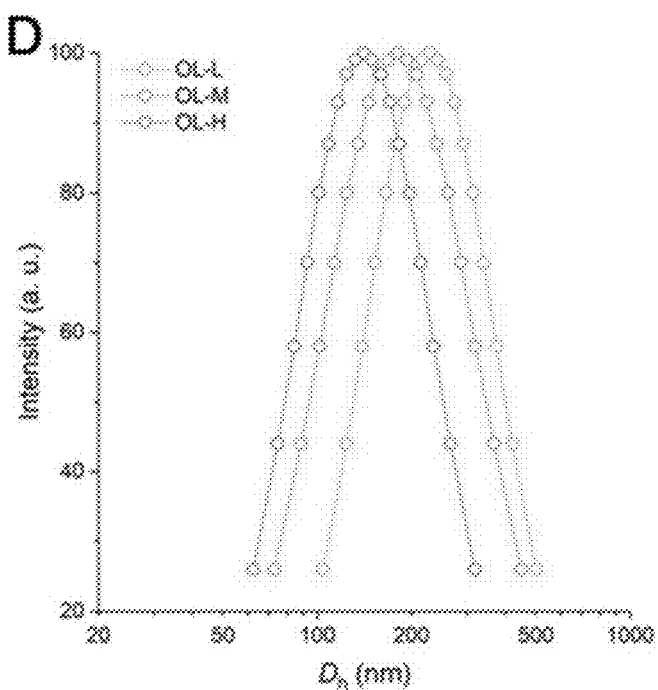

[FIG. 5]
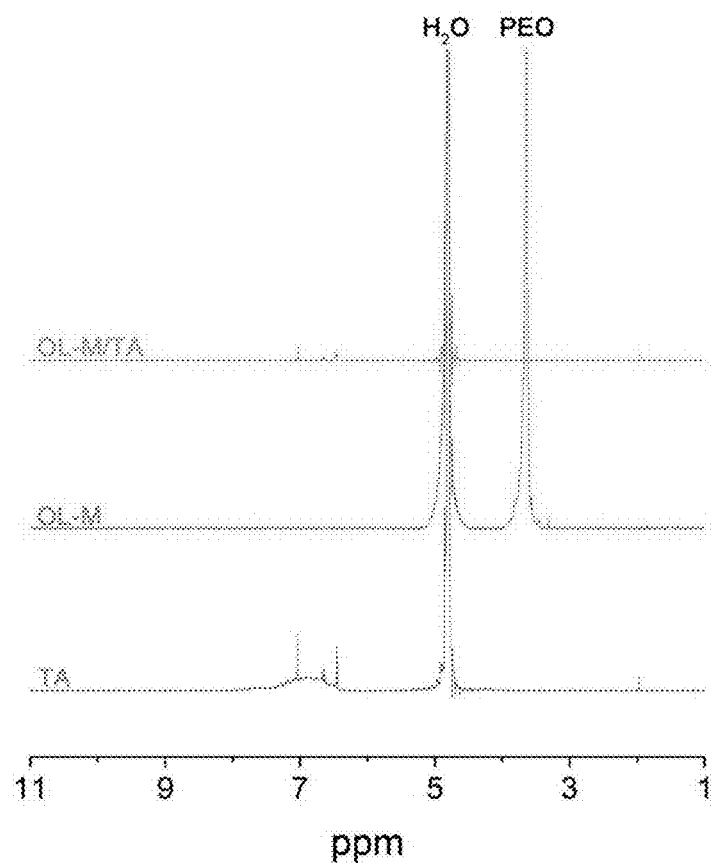

[FIG. 6]
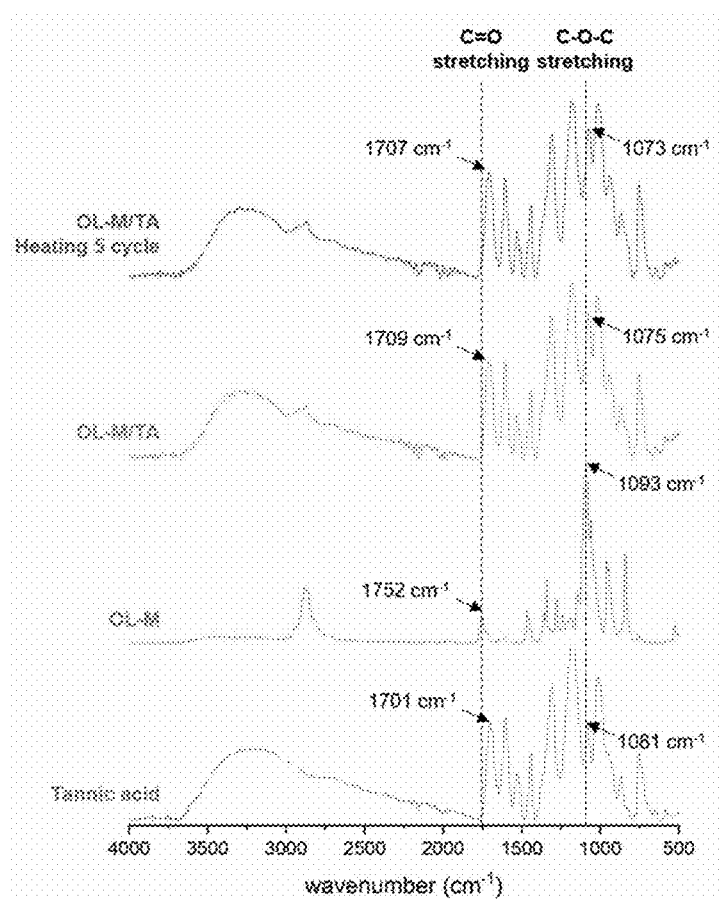

[FIG. 7(a)]
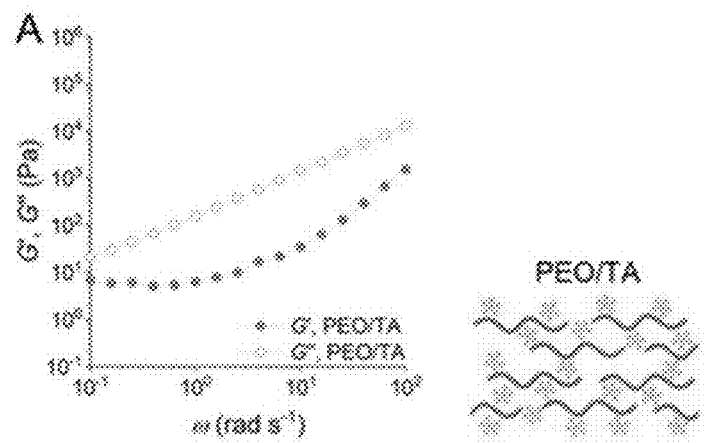
[FIG. 7(b)]
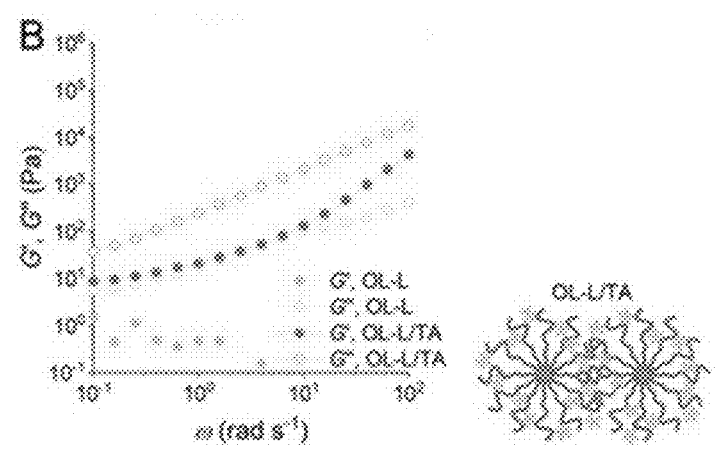
[FIG. 7(c)]
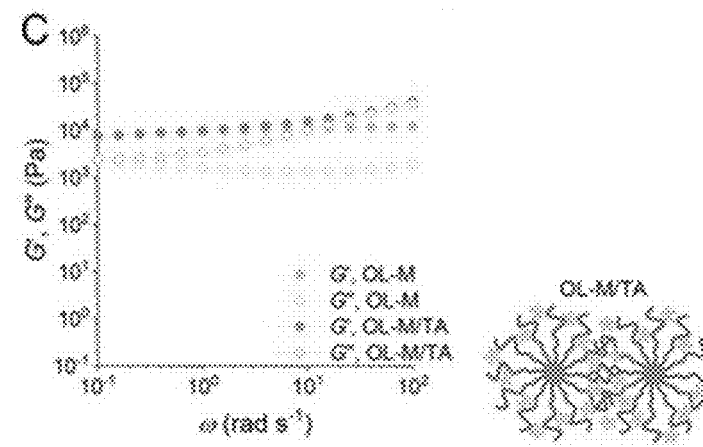

[FIG. 7(d)]
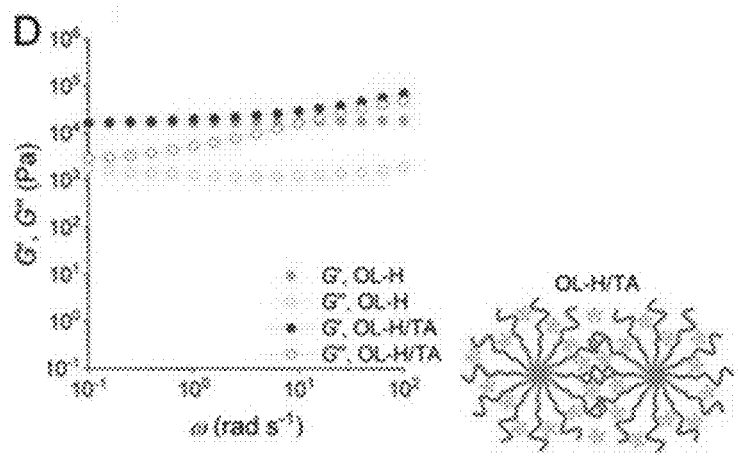
[FIG. 7(e)]
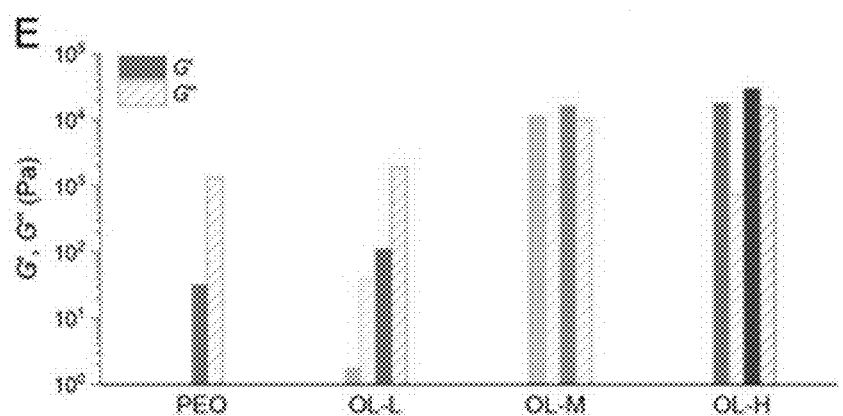
[FIG. 7(f)]
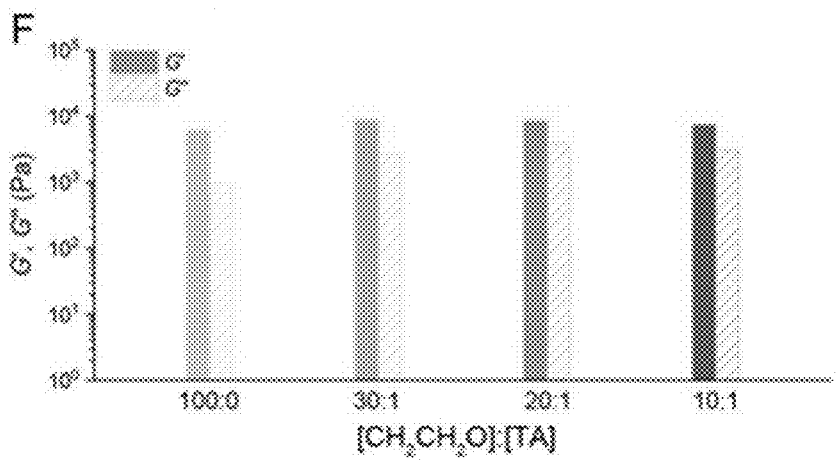

[FIG. 8(a)]
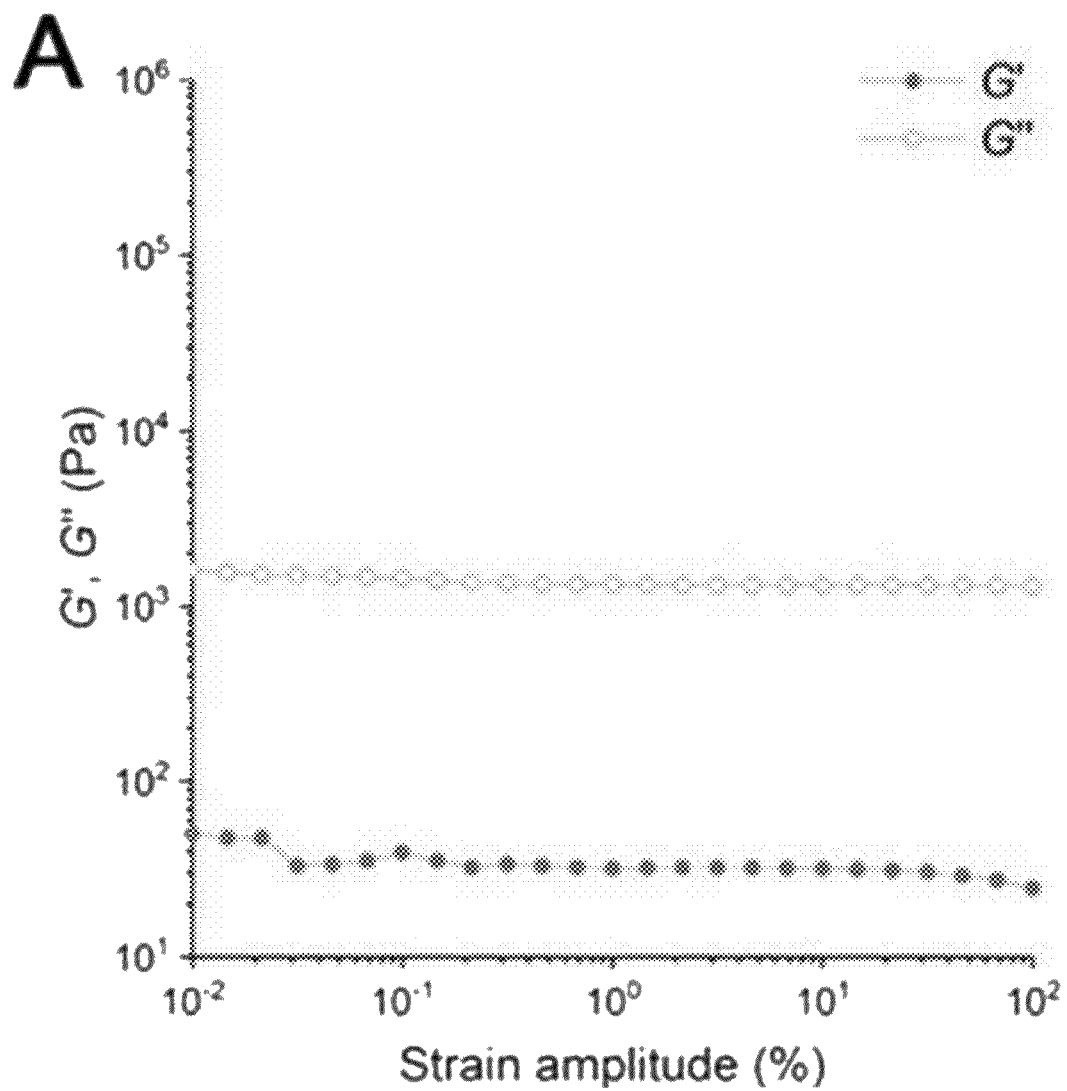

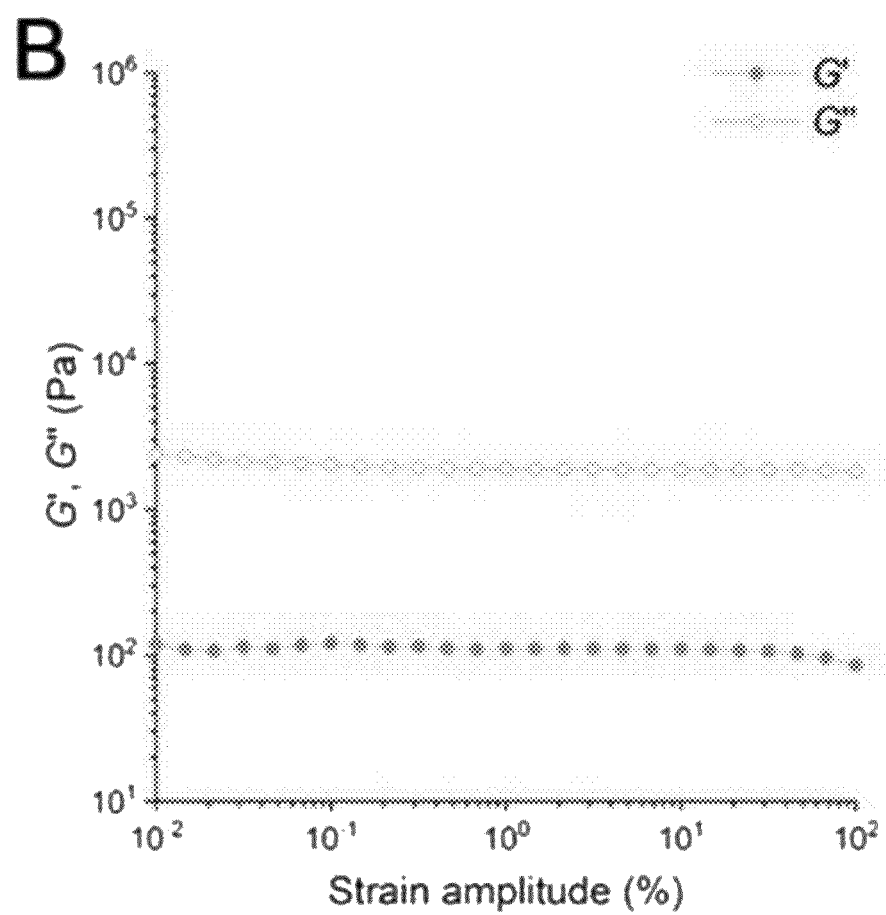
[FIG. 8(b)]

[FIG. 8(c)]
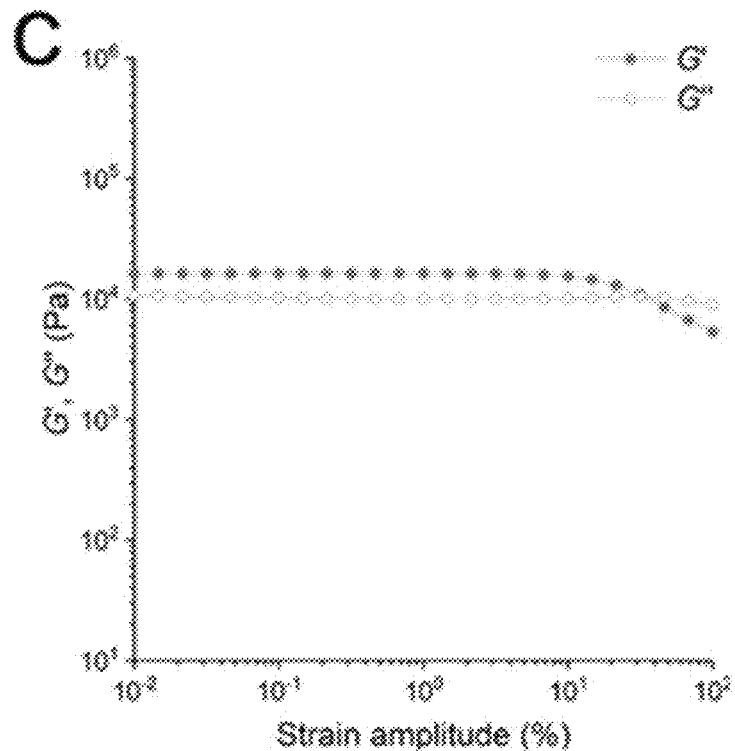
[FIG. 8(d)]
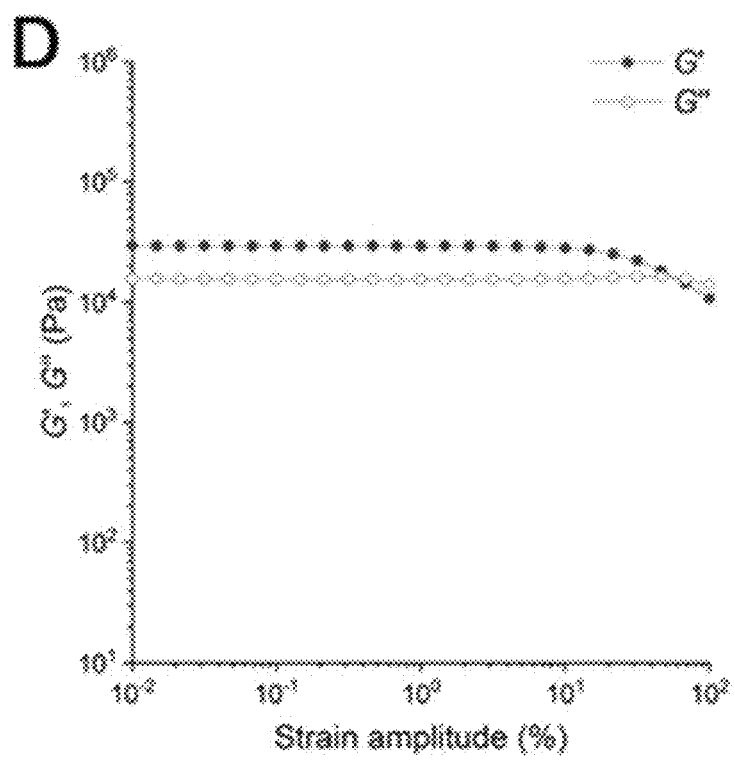

[FIG. 8(e)]
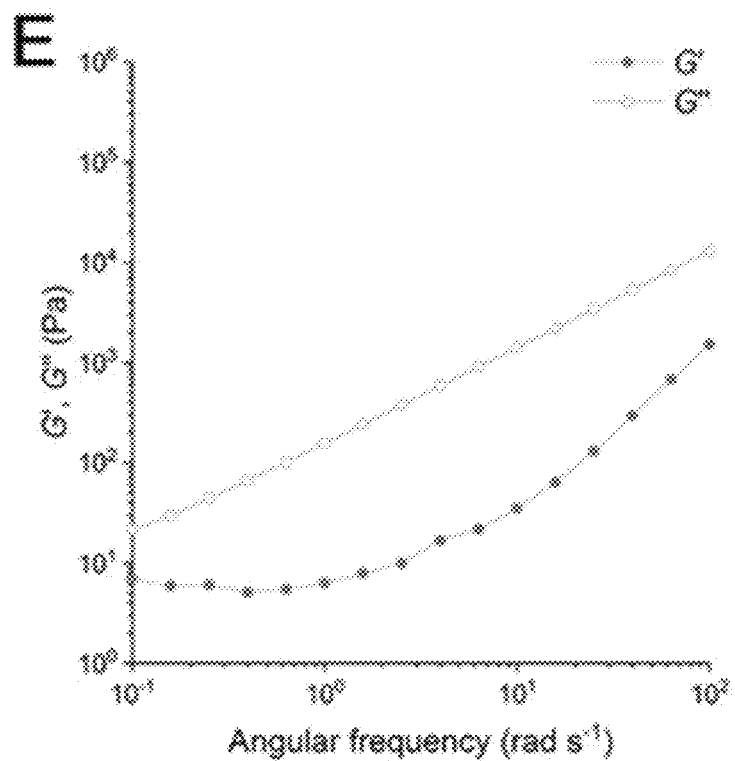
[FIG. 8(f)]
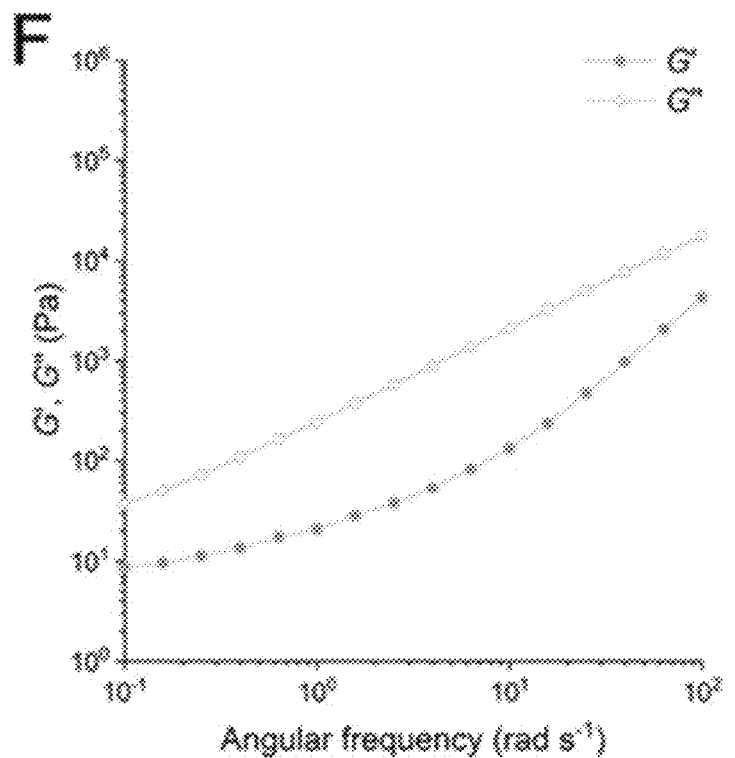

[FIG. 8(g)]
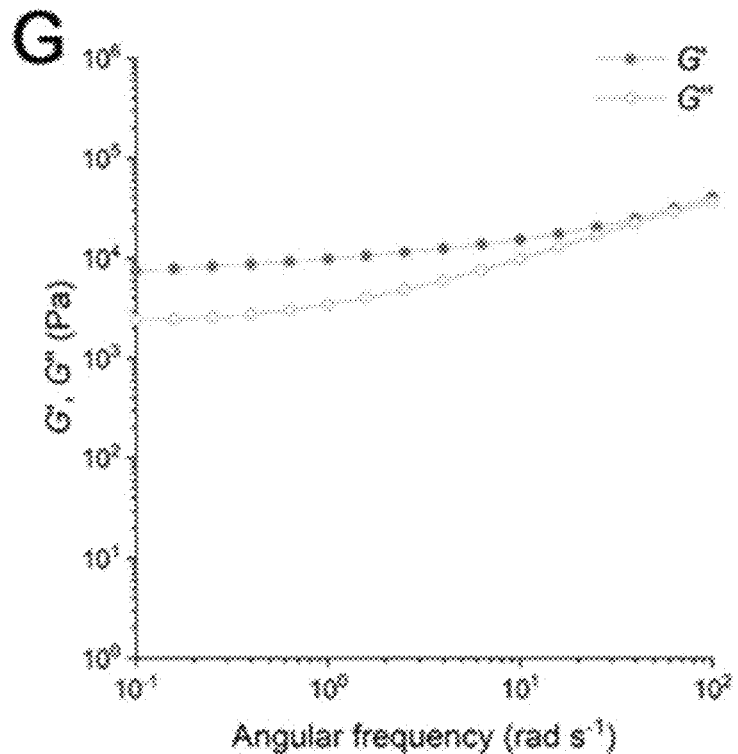
[FIG. 8(h)]
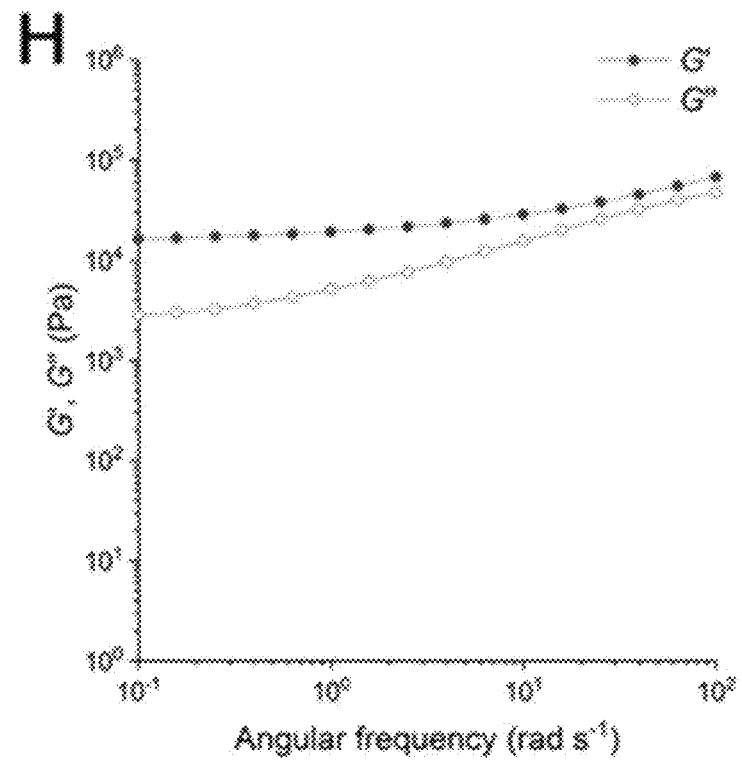

[FIG. 9(a)]
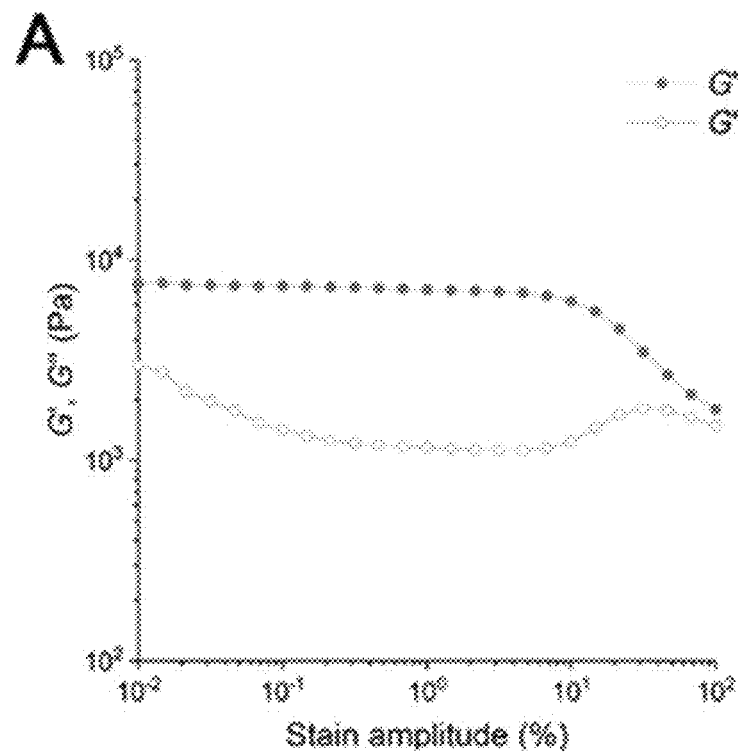
[FIG. 9(b)]
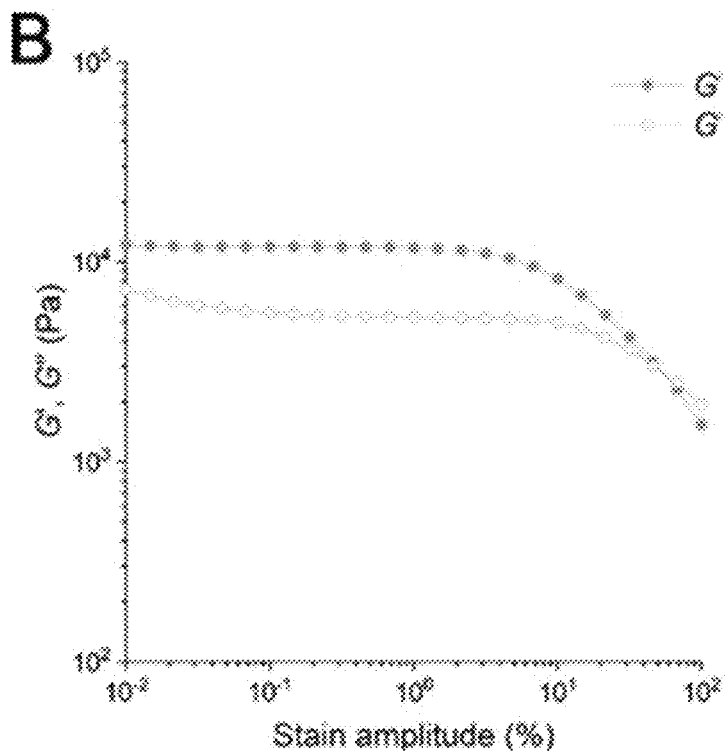

[FIG. 9(c)]
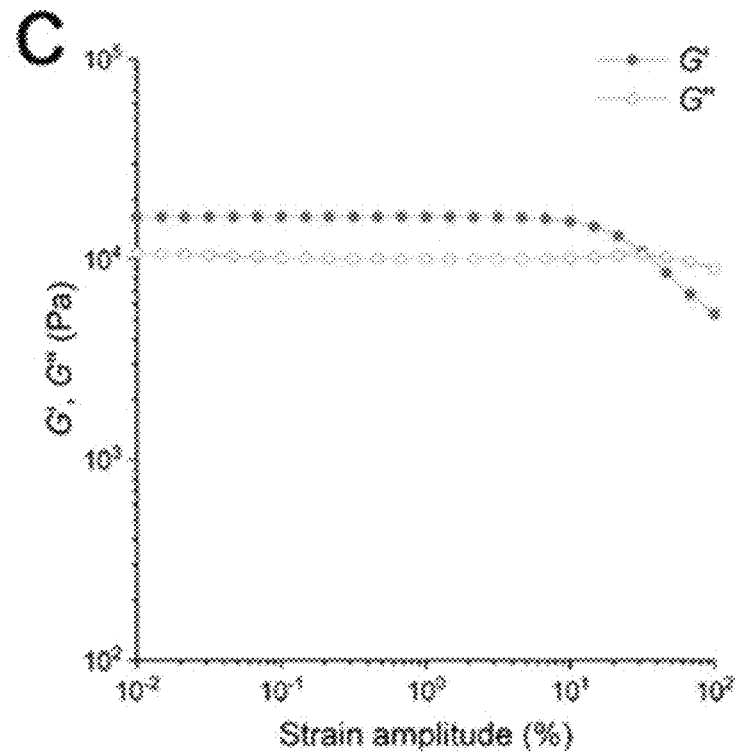
[FIG. 9(d)]
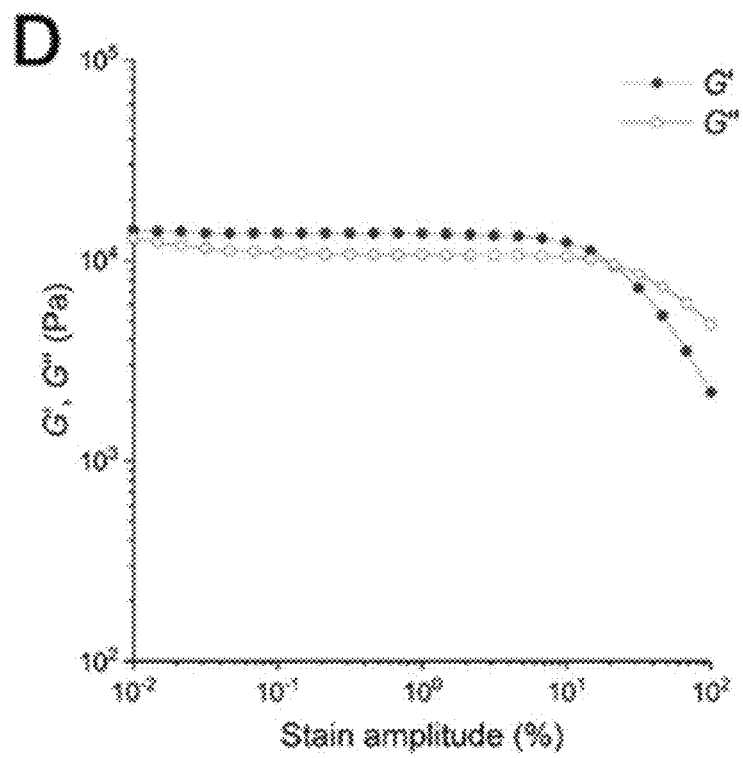

[FIG. 9(e)]
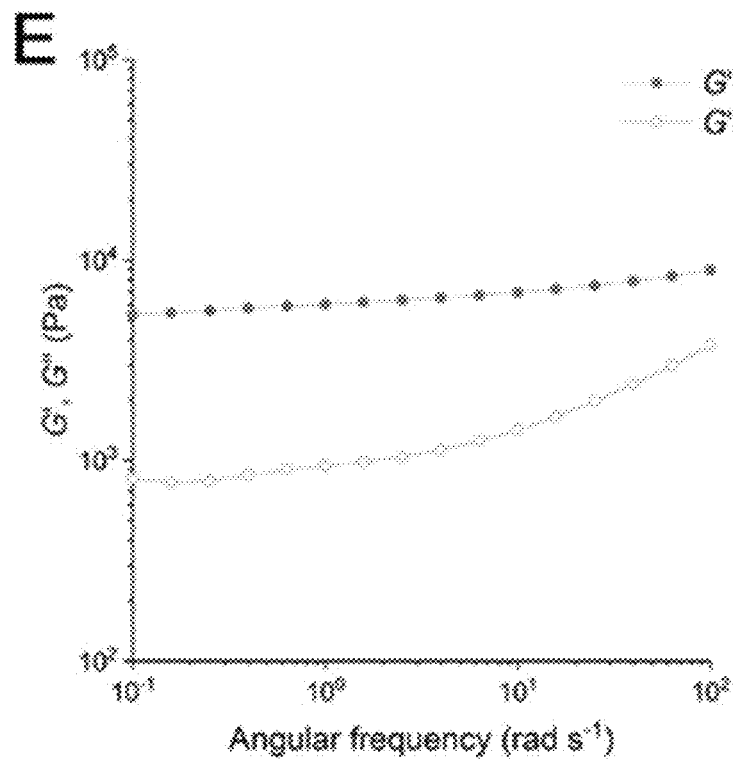
[FIG. 9(f)]
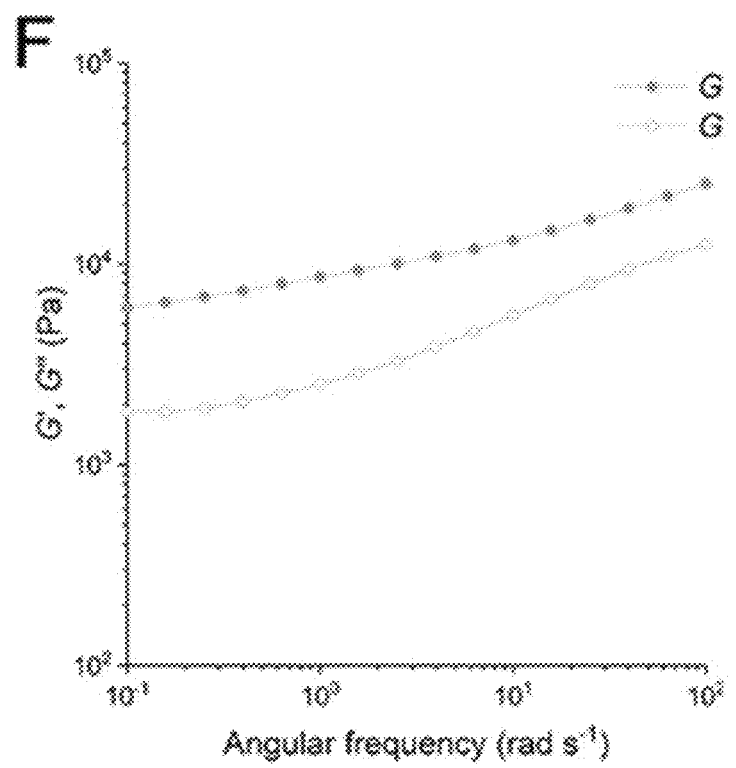

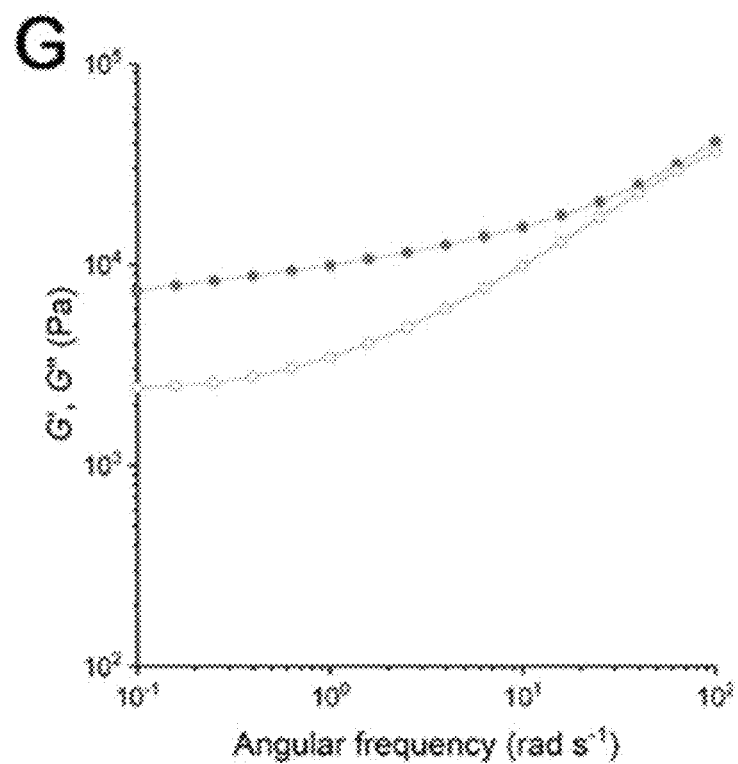
[FIG. 9(g)]

[FIG. 9(h)]
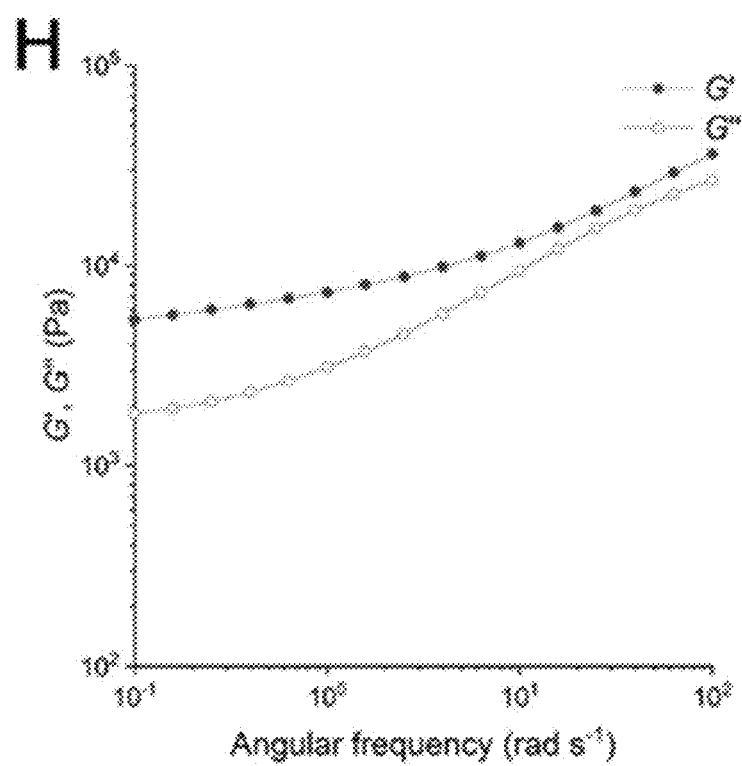

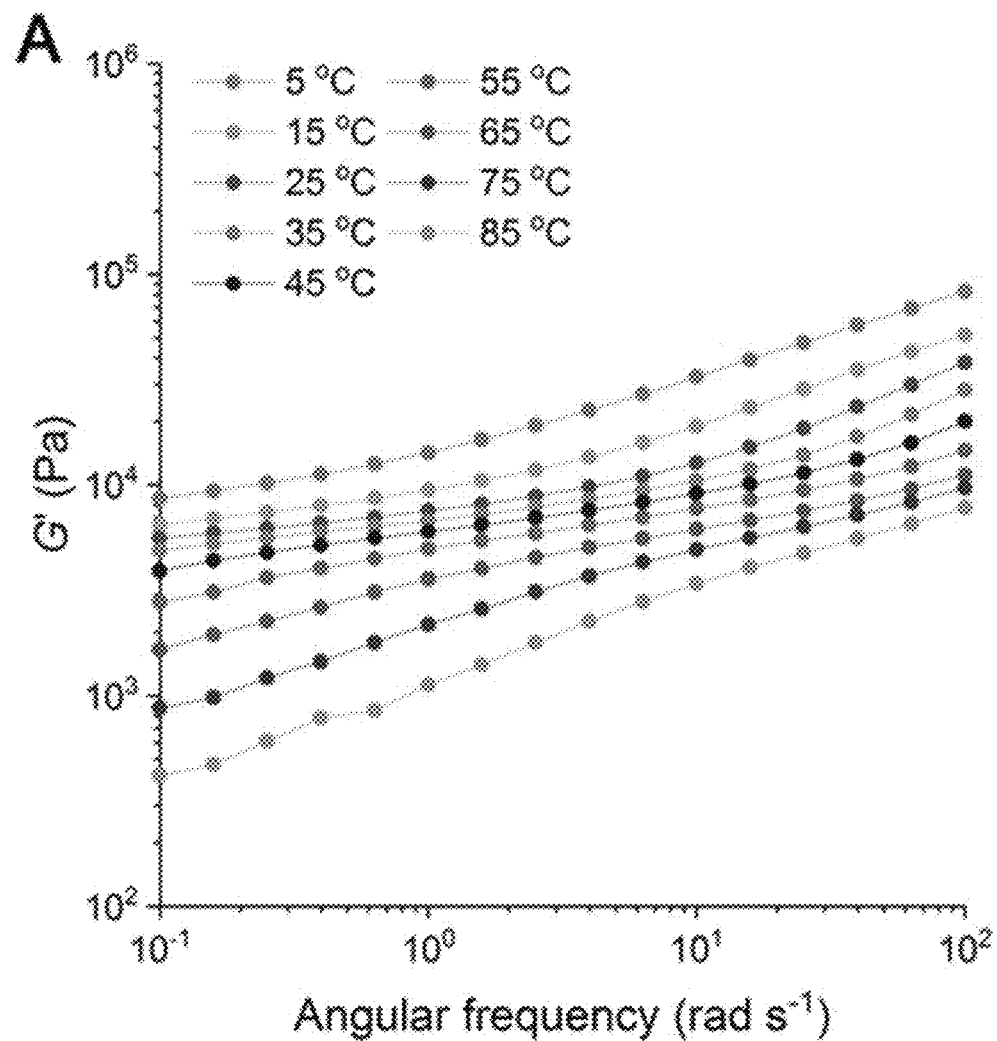
[FIG. 10(a)]

[FIG. 10(b)]
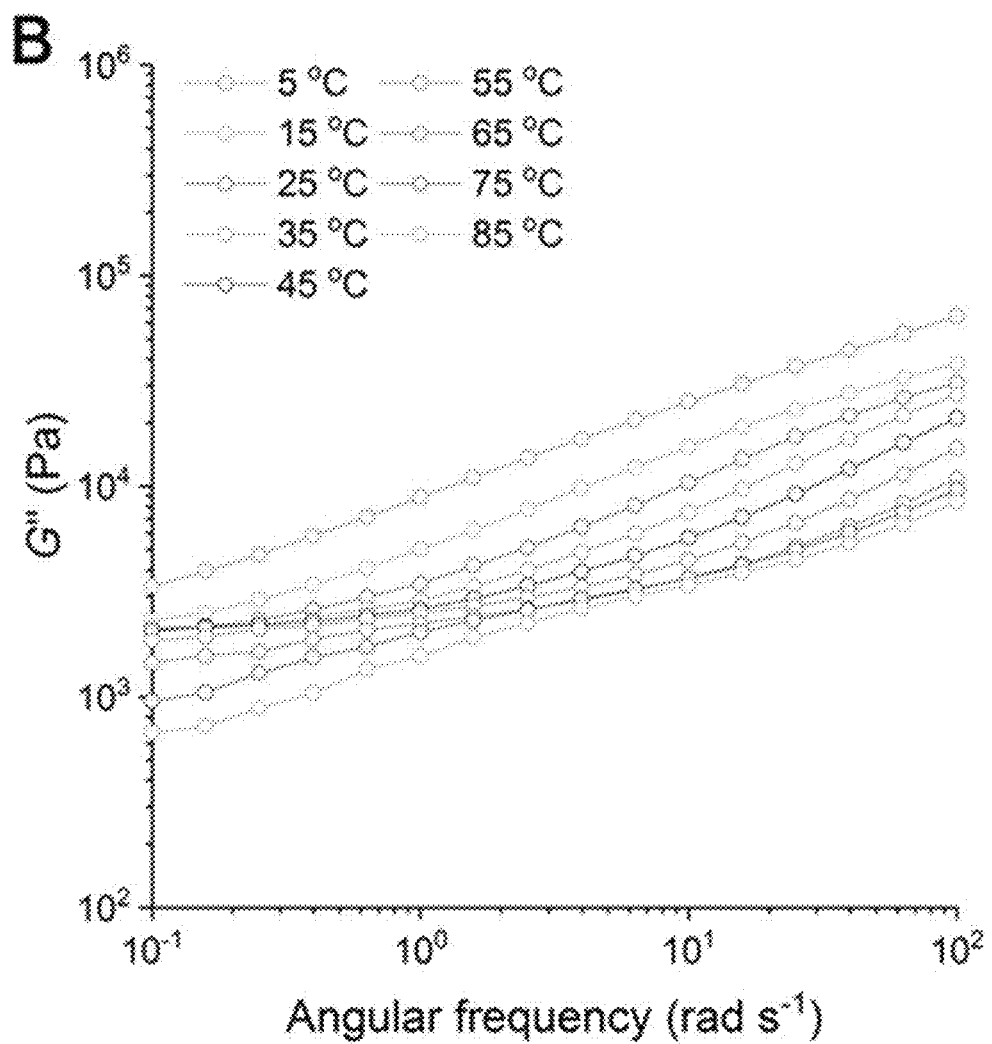

[FIG. 10(c)]
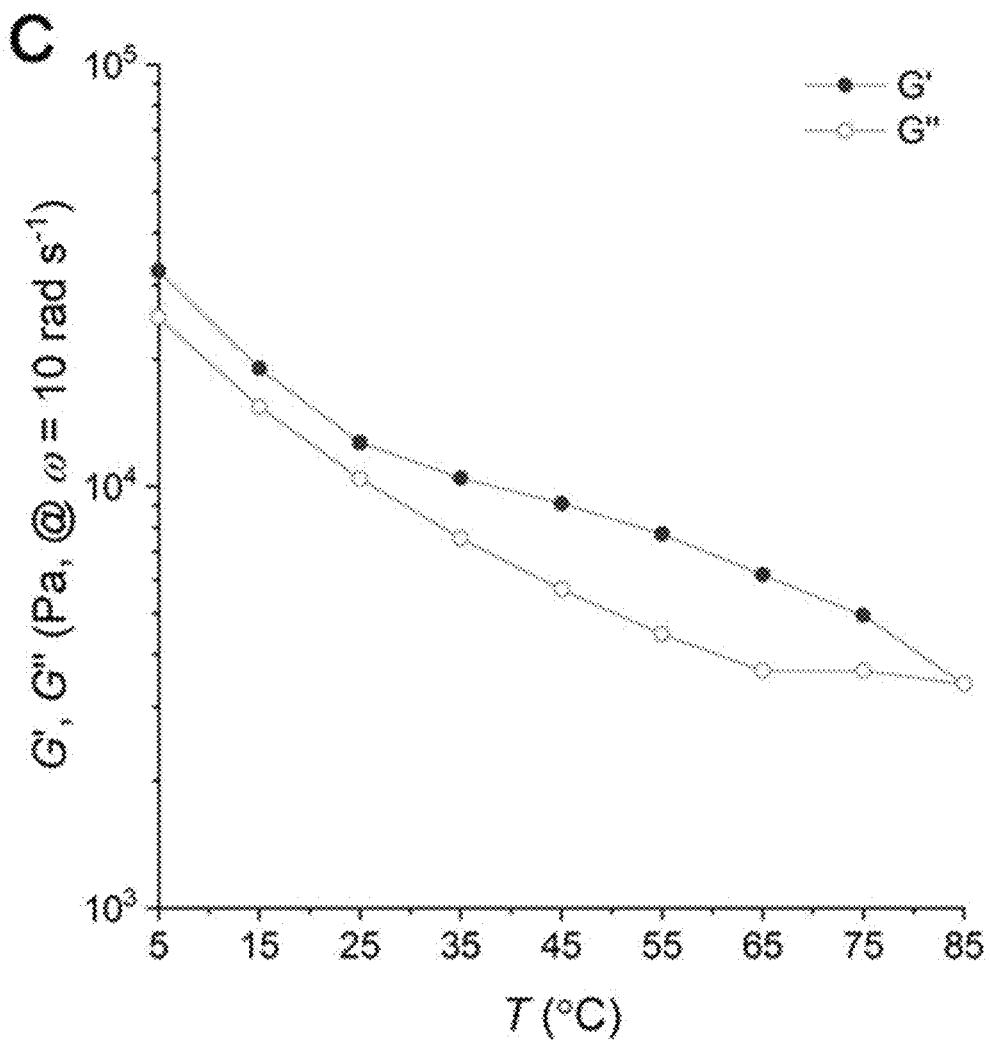

[FIG. 11(a)]
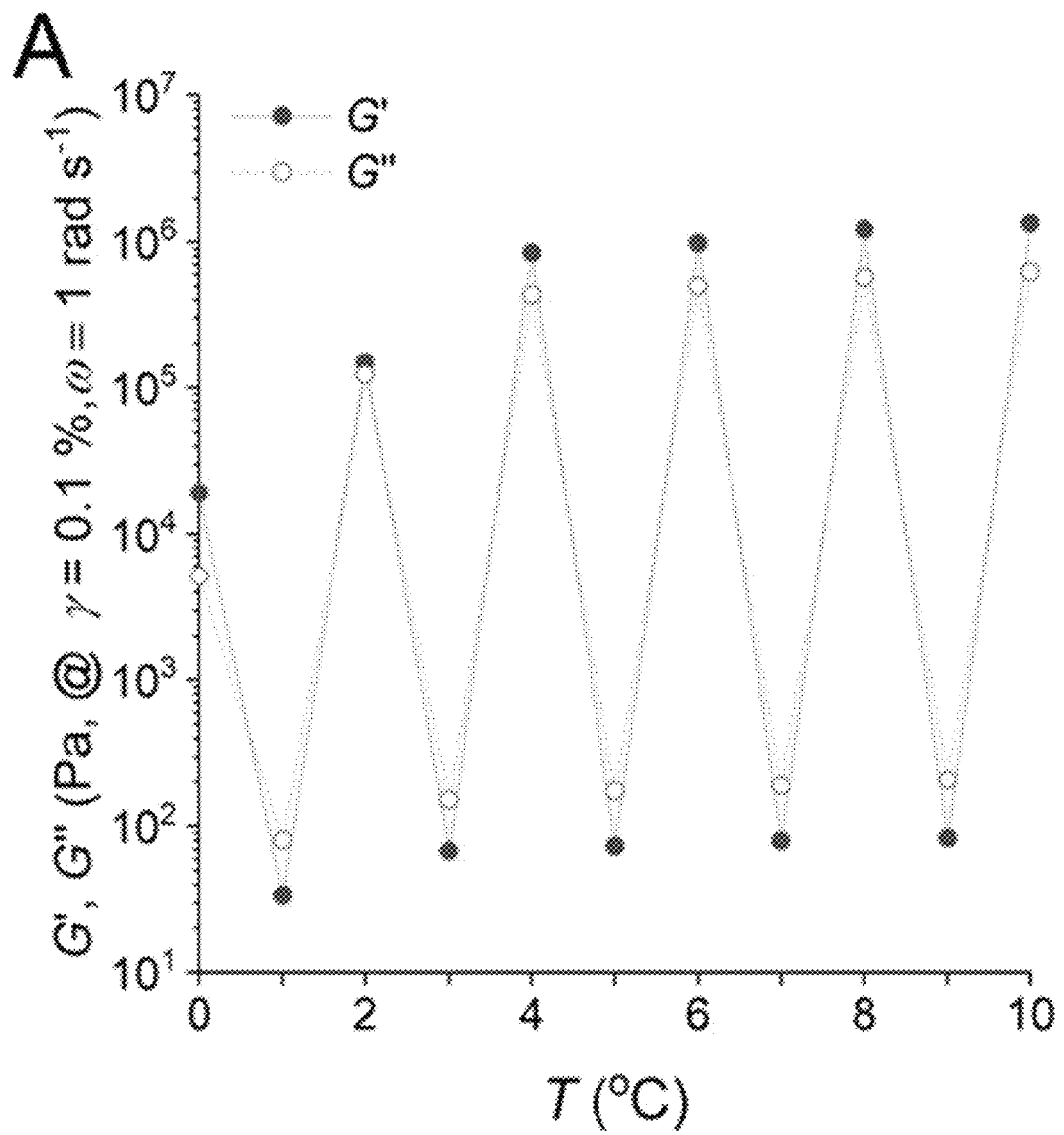

[FIG. 11(b)]
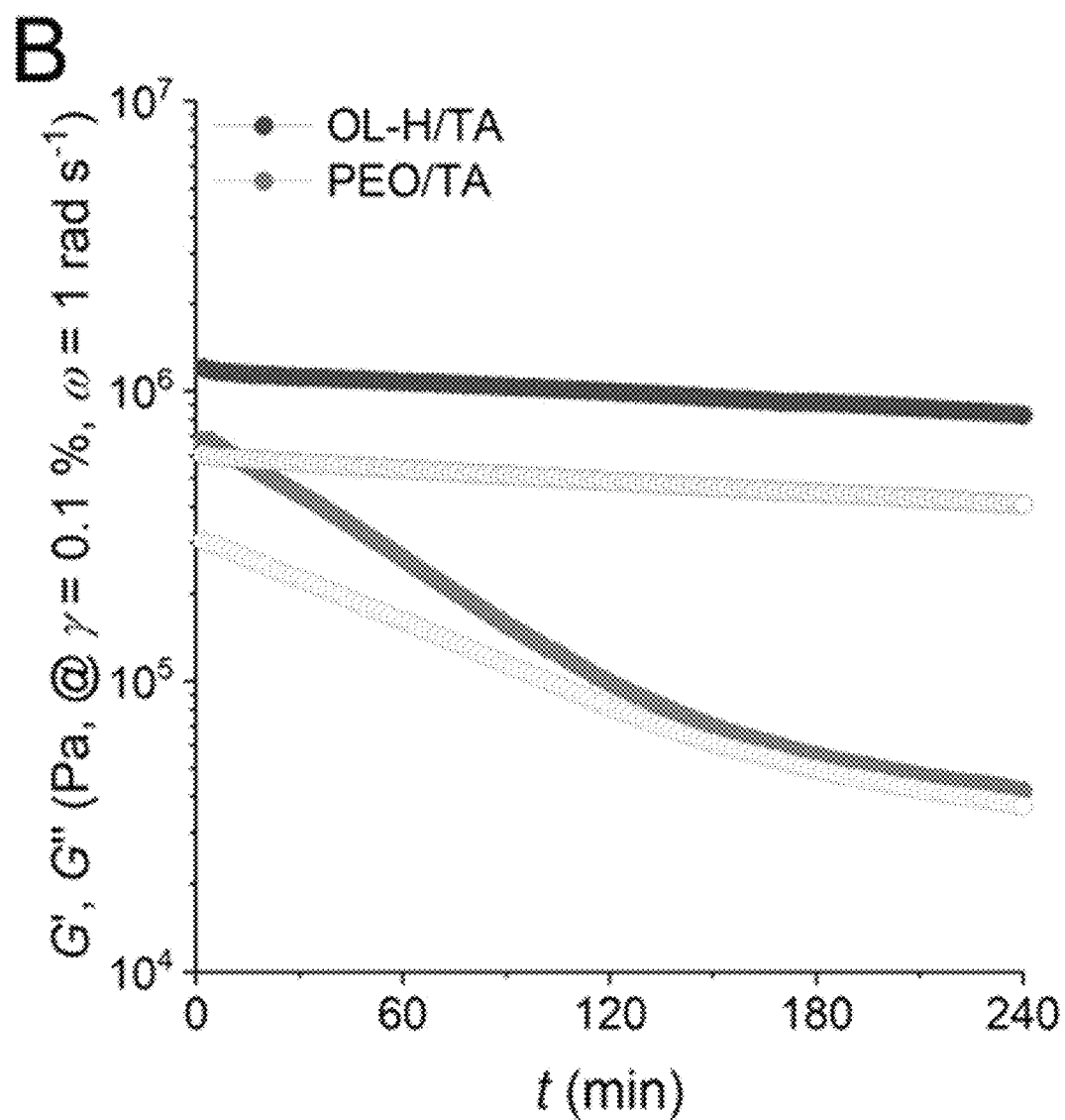

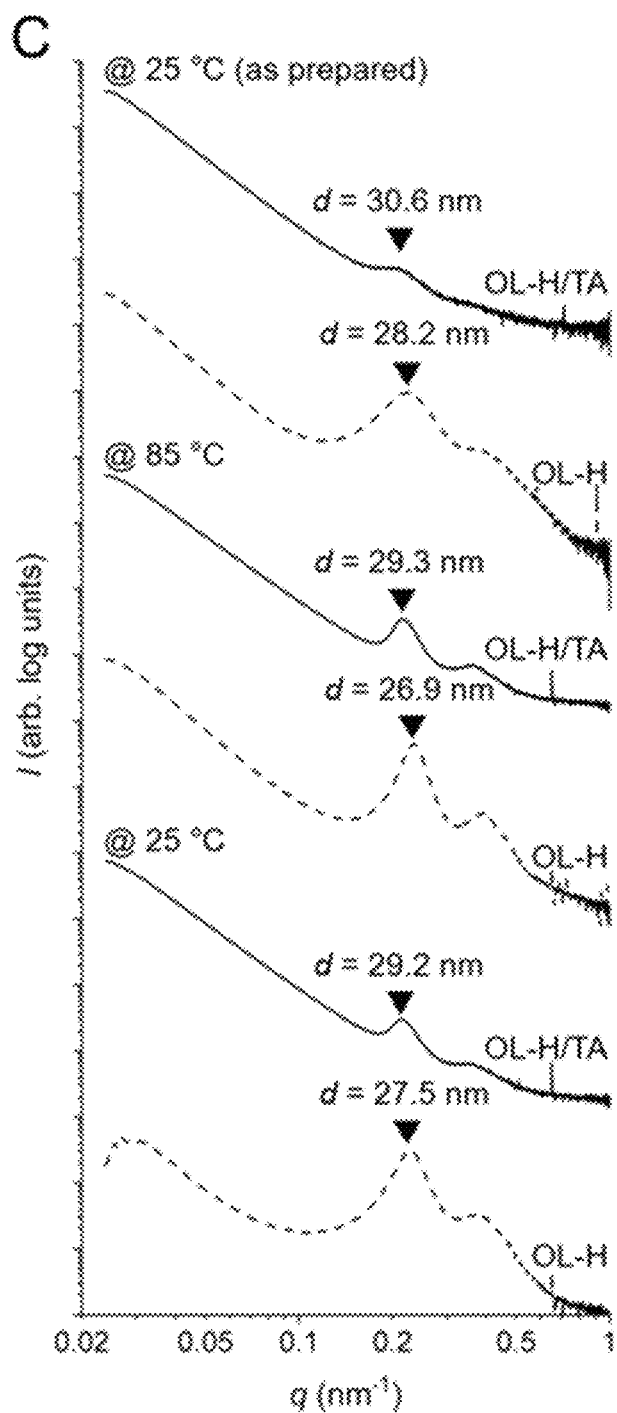
[FIG. 11(c)]

[FIG. 12(a)]
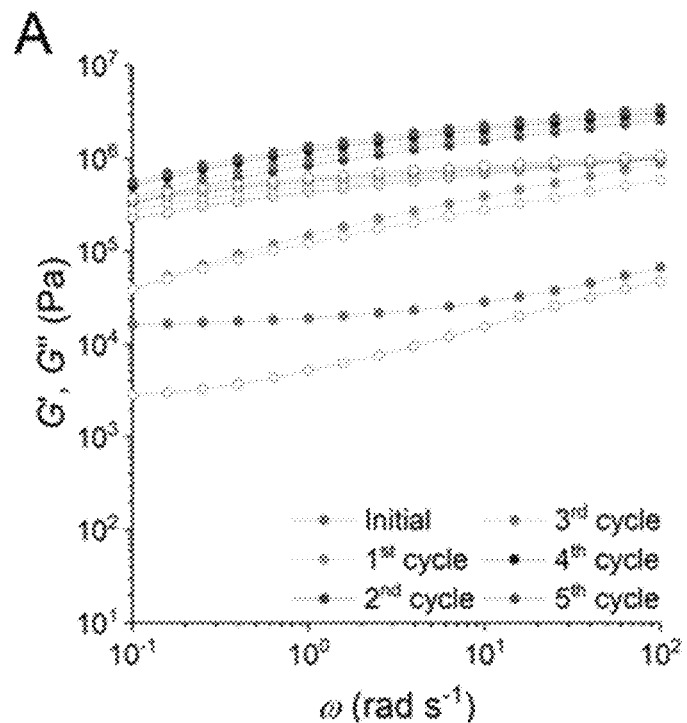
[FIG. 12(b)]
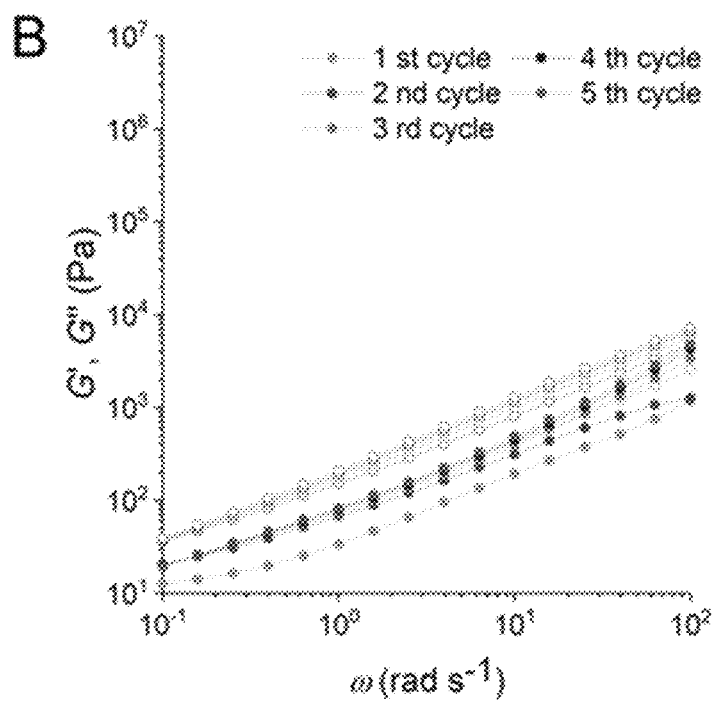

[FIG. 12(c)]
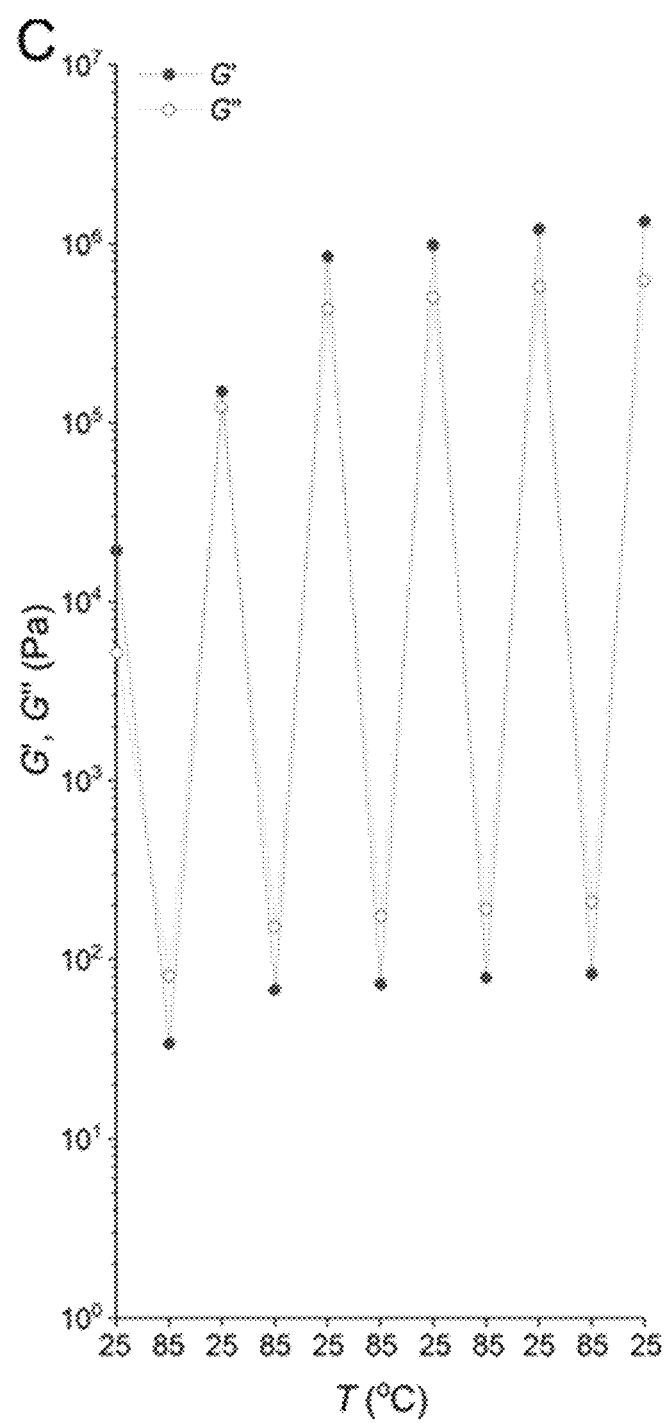

[FIG. 13(a)]
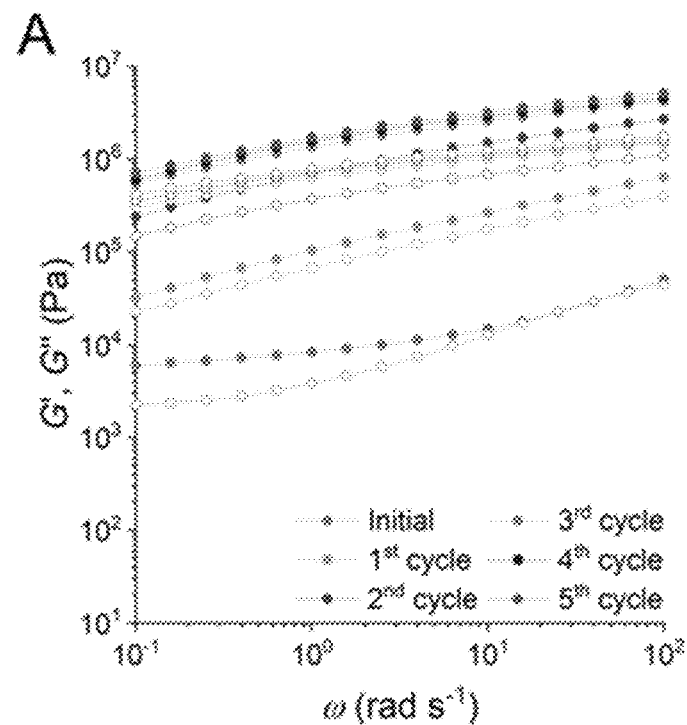
[FIG. 13(b)]
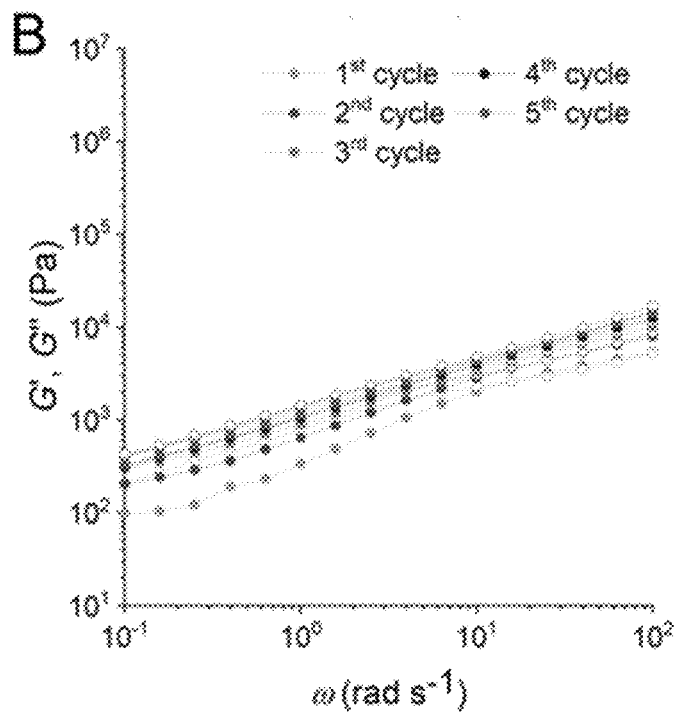

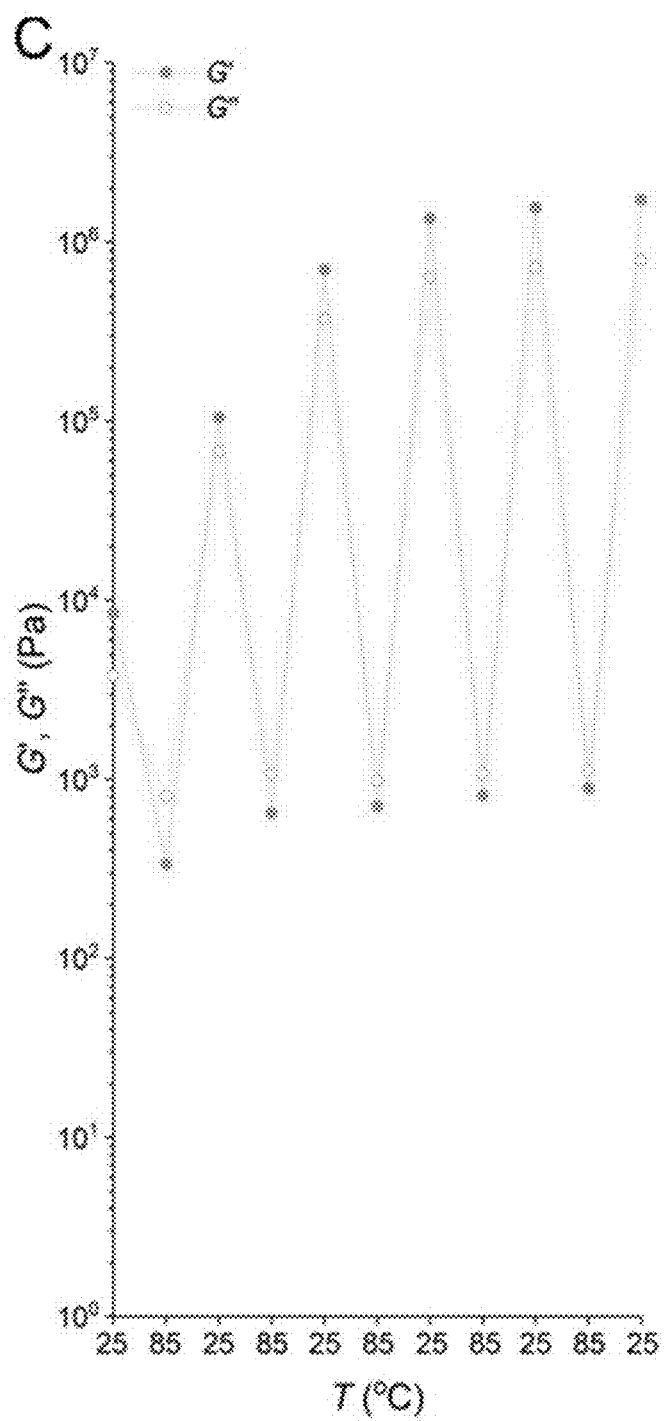
[FIG. 13(c)]

[FIG. 14(a)]
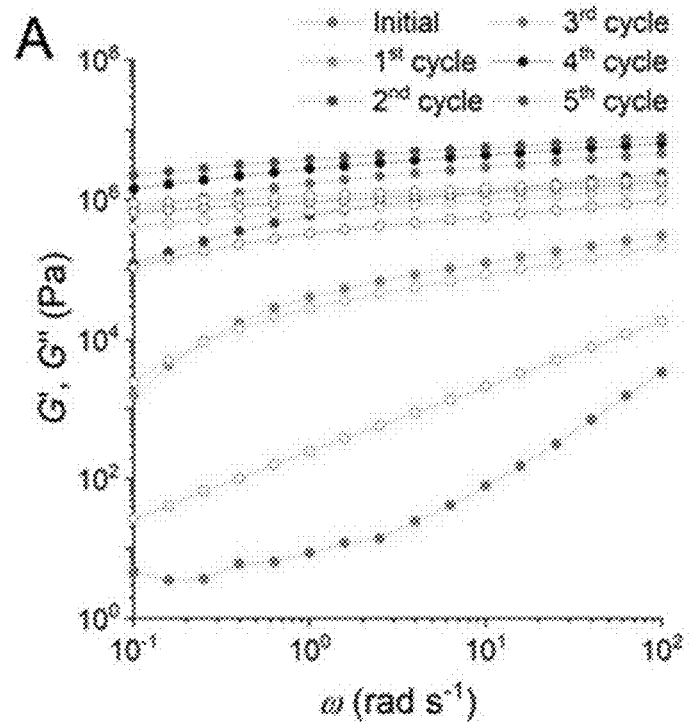
[FIG. 14(b)]
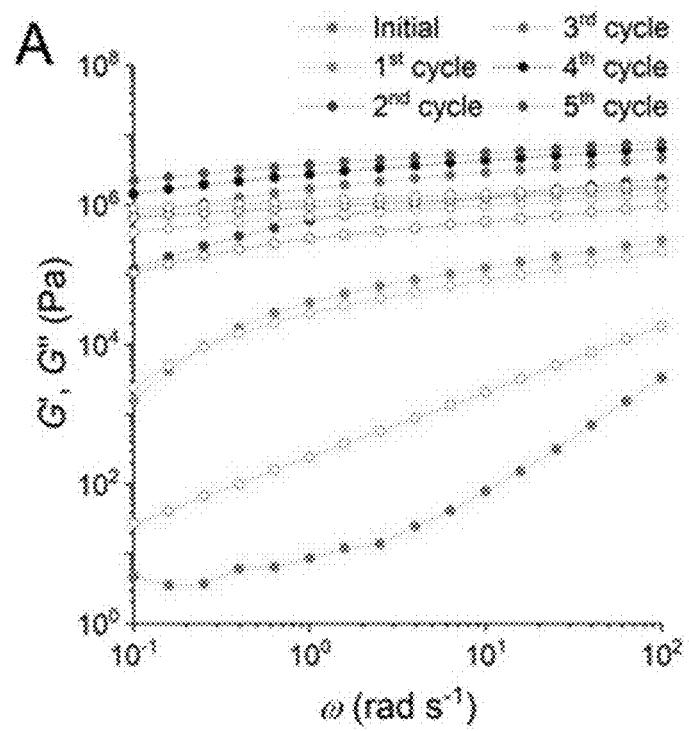

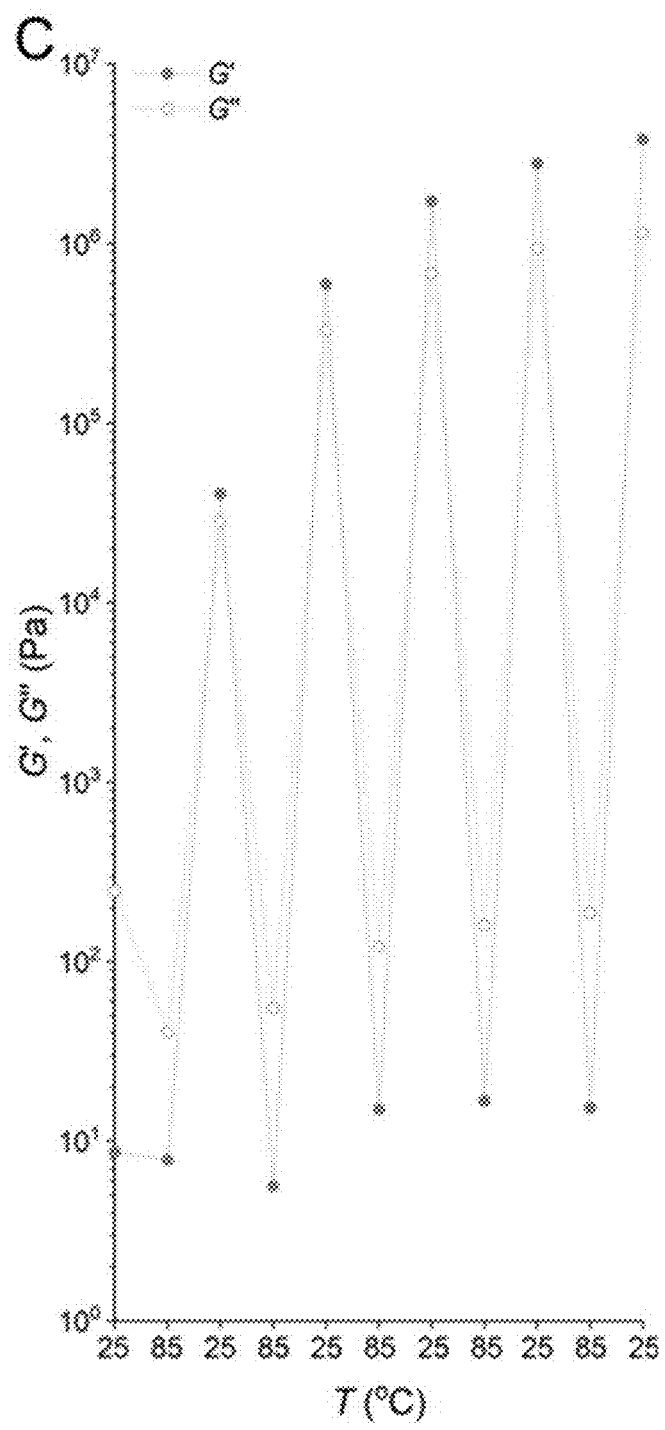
[FIG. 14(c)]

[FIG. 15]
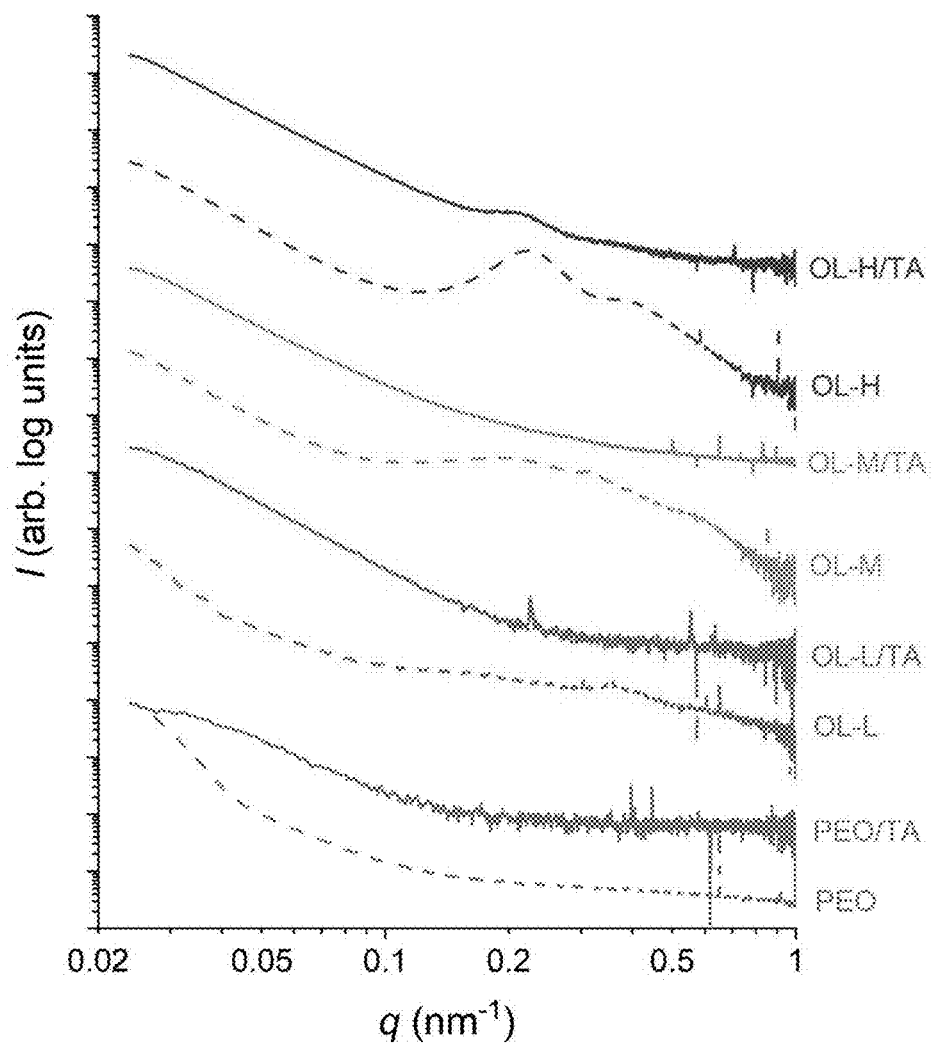

[FIG. 16(a)]
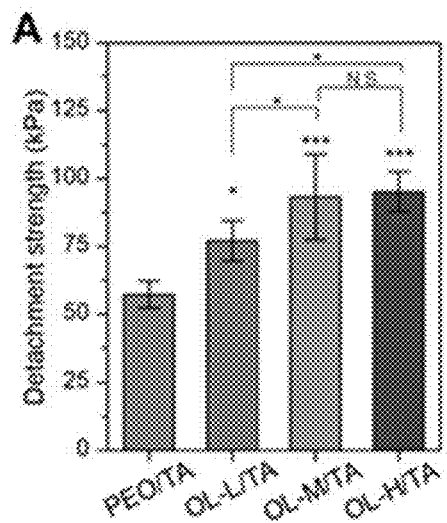
[FIG. 16(b)]
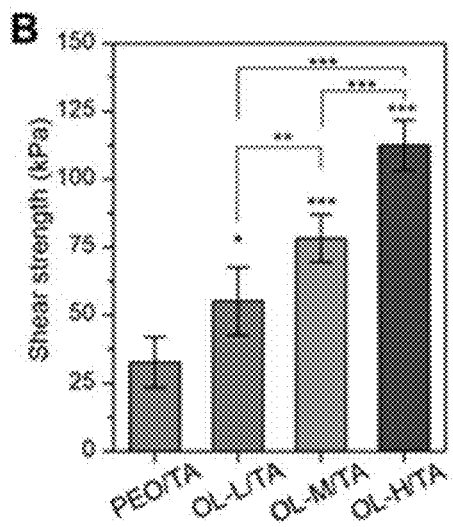

[FIG. 16(c)]
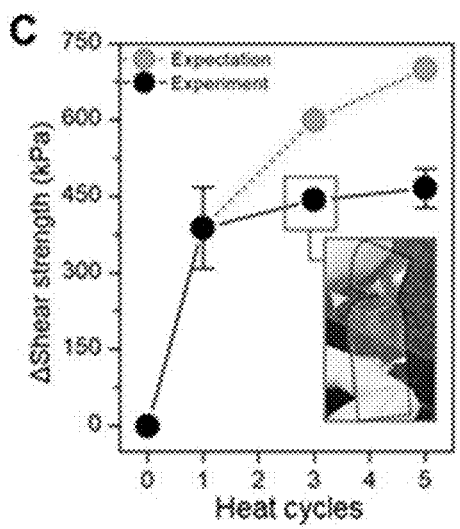
[FIG. 16(d)]
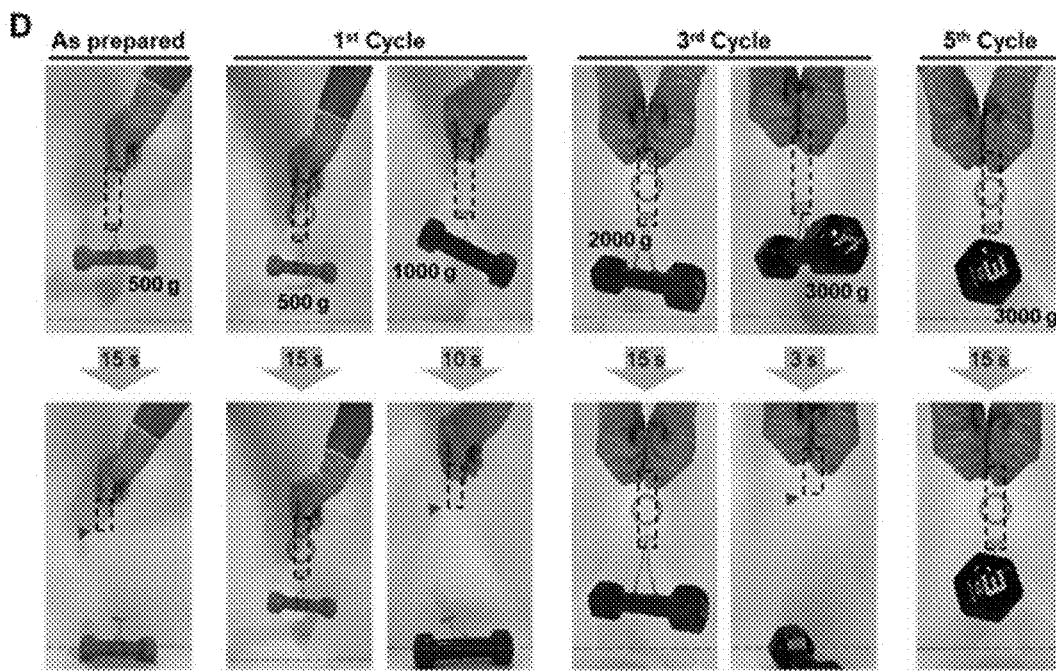

ADHESIVE COMPOSITION AND METHOD FOR PREPARING SAME

TECHNICAL FIELD

The present disclosure relates to an adhesive composition and a method for preparing the same, and more particularly, to an adhesive composition having high biodegradability and excellent mechanical properties while being biocompatible, and a method for preparing the same.

BACKGROUND ART

An adhesive is a material that is used to join two surfaces through physical and chemical force when applied between two surfaces, thereby integrally bonding different types of articles. Various types of adhesives are widely used, and typical examples thereof include a resin-based organic adhesive containing cyanoacrylate as a main component, a mixed-based organic adhesive containing an epoxy, and the like. However, since a synthetic organic adhesive may release volatile organic solvents or residual monomers, it may be harmful to health, do not decompose well under natural conditions, and is difficult to use in water or to a human body. Therefore, the demand for water-based adhesives with high biodegradability and biocompatibility is increasing. Particularly, the adhesives containing natural products as a main component have been developed.

Tannic acid, which has been attracting attention recently, is a natural product containing a large amount of catechol and pyrogallol, and can strongly interact with other substances through hydrogen bonding. Under high-concentration aqueous solution conditions, tannic acid forms coacervate with poly(vinyl alcohol) and poly(ethylene glycol) and precipitates as a highly viscous liquid, and this liquid is known to show high adhesiveness. It does not need to be cured by applying heat, has low toxicity, and can maintain an adhesive strength even in water, and thus has received a lot of interest, but since it is a liquid, there is a limit to improving mechanical properties and thus exerting stronger adhesive strength. An attempt has been conducted to improve mechanical properties and increase the adhesive strength by using hydrogel, which is a solid material containing a large amount of water, as an adhesive, but since hydrogel is usually made through cross-linking polymerization of vinyl monomers, there is a problem that biodegradability is low and the re-bonding ability is weak, unlike non-covalent bonds such as hydrogen bonds.

Therefore, there is a demand for the development of a new adhesive composition having high biodegradability and excellent mechanical properties while being biocompatible, and a method for preparing the same.

DETAILED DESCRIPTION OF THE INVENTION

Technical Problem

It is an object of the present disclosure to provide an adhesive composition having high biodegradability and excellent mechanical properties while being biocompatible.

It is another object of the present disclosure to provide a method for preparing an adhesive composition having high biodegradability and excellent mechanical properties while being biocompatible.

It is yet another object of the present disclosure to provide an adhesive containing the adhesive composition.

Technical Solution

Provided herein is an adhesive composition comprising: an amphiphilic block copolymer containing a hydrophilic block and a hydrophobic block, tannic acid and water.

Also provided herein is a method for preparing an adhesive composition, comprising the steps of:
copolymerizing a hydrophilic polymer and a hydrophobic polymer to form an amphiphilic block copolymer containing a hydrophilic block and a hydrophobic block;
adding the amphiphilic block copolymer and tannic acid to water; and
stirring the aqueous solution to form a hydrogel.

Further provided herein is an adhesive comprising the composition.

Hereinafter, an adhesive composition and a method for preparing the same according to specific embodiments of the present disclosure will be described in more detail.

The technical terms used herein is for the purpose of describing exemplary embodiments only and is not intended to limit the scope of the invention. The singular forms "a," "an" and "the" are intended to include plural forms, unless the context clearly indicates otherwise. It should be understood that the terms "comprise," "include", "have", etc. are used herein to specify the presence of stated features, integers, steps, components or combinations thereof, but do not preclude the presence or addition of one or more other features, integers, steps, components, or combinations thereof.

Although the present disclosure may have various forms and various modifications can be made thereto, specific embodiments will be exemplified and explained in detail. However, it is not intended to limit the present disclosure to disclosed forms, and it should be understood that all the modifications, equivalents or substitutions within the idea and technical scope of the present disclosure are included in the present disclosure.

According to one embodiment of the disclosure, there is provided an adhesive composition comprising: an amphiphilic block copolymer containing a hydrophilic block and a hydrophobic block, tannic acid and water.

The present inventors conducted intensive research on the adhesive composition, and found through experiments that when the adhesive composition includes an amphipathic block copolymer containing a hydrophilic block and a hydrophobic block, tannic acid and water, it has high biodegradability and excellent mechanical properties while being biocompatible, thereby completing the present disclosure.

The adhesive composition of the embodiment includes an amphiphilic block copolymer containing both a hydrophilic block capable of interacting with tannic acid and a hydrophobic block for forming self-assembly in an aqueous solution, and thus can realize a remarkably high elastic modulus as compared with the conventional adhesive composition and also is composed entirely of a biocompatible substance to ensure biodegradability, so that it can be decomposed quickly after use, thus realizing a water-based adhesive that is harmless to the environment.

First, tannic acid (TA) is a material capable of hydrogen bonding with a hydrophilic polymer and the like because it has abundant hydroxyl groups, and the adhesive composition of the embodiment includes tannic acid and an amphiphilic block copolymer containing a hydrophilic block and a hydrophobic block, so that the hydrophilic block in the amphiphilic block copolymer and tannic acid can interact with each other to form a hydrogen bonding network.

Additionally, the hydrophobic block in the amphiphilic block copolymer can make nanometer-level domains through self-assembly in aqueous solution, and the domain can play a role of supporting the hydrogen bonding network of the hydrophilic block and tannic acid.

That is, when the amphiphilic block copolymer containing the hydrophilic block and the hydrophobic block and tannic acid are mixed in aqueous solution, a coacervate hydrogel having high adhesiveness is produced. Since the hydrogel behaves as a solid phase at 5 to 65° C., its weak tensile and shear strength is greatly enhanced as compared with the liquid phase hydrogel, thereby capable of overcoming the limit of deformation easily caused by external stress. Thereby, the cohesive strength, which is an important physical property of the adhesive, can be greatly enhanced.

Meanwhile, a hydrophilic block whose degree of hydration changes depending on the temperature can be introduced as the hydrophilic block of the amphiphilic block copolymer. As the temperature in water increases, the degree of hydration decreases, and a hydrophilic block in which the chain shrinks is introduced, whereby the block copolymer hydrogel containing the hydrophilic block exhibits a gel-sol transition phenomenon that transitions to a liquid phase at a specific temperature or higher.

Therefore, the hydrogen bonds between the hydrophilic block and the tannic acid can be aligned through a thermal quenching process of heating the hydrophilic block of the amphiphilic block copolymer to a temperature near the corresponding temperature showing the gel-sol transition, and then lowering it to a room temperature again, thereby capable of significantly enhancing the mechanical properties.

Meanwhile, since a high-temperature liquid state is advantageous for uniformly applying to the surface, it is very useful for increasing the interfacial adhesive strength, so that an adhesive having excellent cohesive strength and interfacial adhesive strength at room temperature can be obtained.

Further, the thermal quenching may be continuously performed two or more times, and hydrogen bonds are further locally densified by continuous heating and cooling, and the elastic and viscous characteristics can be amplified to further improve the mechanical properties.

Meanwhile, the hydrophilic block of the amphiphilic block copolymer may be poly(ethylene oxide) (PEO).

Further, the hydrophobic block of the amphipathic block copolymer may be either a polylactide-based polymer or a polylactone-based polymer.

The polylactide-based polymer may include at least one polymer selected from the group consisting of poly(d,l-lactide) and poly(l-lactide). That is, the polylactide-based polymer may include one type of poly(d,l-lactide), one type of poly(l-lactide), or a mixture of two or more thereof. The poly(d,l-lactide) is a homopolymer obtained by homopolymerization of a d,l-lactide monomer, and the poly(l-lactide) is a homopolymer obtained by homopolymerization of l-lactide monomer.

The polylactone-based polymer may include at least one polymer selected from the group consisting of polyvalerolactone and polycaprolactone. That is, the polylactone-based polymer may include one type of polyvalerolactone, one type of polycaprolactone, or a mixture of two or more thereof. The polyvalerolactone is a homopolymer obtained by homopolymerization of a valerolactone monomer, and the polycaprolactone is a homopolymer obtained by homopolymerization of a caprolactone monomer.

Specific examples of the valerolactone monomer are not limited, and delta-valerolactone can be used as an example. Further, the specific example of the caprolactone monomer is not limited, and epsilon-caprolactone can be used as an example.

For example, an amphiphilic block copolymer (PEO-b-PLA; OL) containing poly(ethylene oxide) and polylactide as hydrophilic and hydrophobic blocks, and tannic acid (TA) can be mixed in an aqueous solution to form a PEO-b-PLA/TA (hereinafter, referred to as OL/TA) hydrogel having improved adhesive characteristics.

In the case of a thermal quenching in which the temperature is raised and then lowered to around 75° C., which is the gel-sol transition temperature of the OL/TA hydrogel, the re-alignment of hydrogen bonds between the PEO blocks with lowered hydration degree and the TA can be induced to more strongly connect the polymer network, thereby capable of forming an adhesive having further improved adhesive properties as compared with the OL/TA hydrogel.

FIG. 1 shows the formation of an OL/TA hydrogel by mixing an amphiphilic block copolymer (PEO-b-PLA; OL) containing PEO and PLA as hydrophilic and hydrophobic blocks, respectively, and tannic acid (TA).

FIGS. 2(a) to 2(d) shows a state in which the adhesive properties are improved by thermal quenching in the OL/TA hydrogel. FIG. 2A shows a state in which the hydrophilic block of the amphipathic block copolymer in the form of a micelle is packed by TA acting as a binder through hydrogen bond interaction, to form a network. At this time, the hydrogen bonds are aligned by thermal quenching that heats and cools to a temperature near the gel-sol transition temperature of the amphipathic block copolymer, thereby improving mechanical properties.

FIG. 2B shows the amphiphilic block copolymer (PEO-b-PLA; OL) and tannic acid (TA) used in Examples, and FIG. 2C each shows a state (OL/TA$^Q$) in which an OL/TA hydrogel is formed by mixing an aqueous solution containing OL and tannic acid (TA), and the mechanical properties are improved by thermal quenching. FIG. 2D shows a state that gives a demonstration of the adhesive strength for OL, OL/TA and OL/TA$^Q$.

Meanwhile, the tannic acid may be contained in an amount of 0.5 mol % or more, 1 mol % or more, 2 mol % or more, and 20 mol % or less, and 10 mol % or less, 8 mol % or less with respect to the hydrophilic block repeating unit in the amphiphilic block copolymer.

When the content of the tannic acid is less than 0.5 mol % with respect to the hydrophilic block repeat unit, the tannic acid that forms hydrogen bonds with the hydrophilic block in the amphiphilic block copolymer is relatively deficient, so the interaction between the polymer network and the material surface is weakened, thereby reducing the adhesive strength, and the density of the network formed by the hydrophilic block and tannic acid is reduced, which may cause a problem that a sufficient increase in physical strength cannot be expected.

In addition, when the content of the tannic acid exceeds 20 mol % with respect to the hydrophilic block repeating unit, the content of tannic acid is too high and the tannic acid that did not participate in network formation is extracted and removed with an aqueous solution, which may cause a problem that an increase in physical strength over a certain level cannot be expected.

Further, in regard to the composition ratio of the hydrophilic block to the hydrophobic block in the amphiphilic block copolymer, the volume fraction ($f_{hydrophobic}$) of the hydrophobic block may be 0.01 or more, 0.05 or more, or 0.10 or more, and 0.50 or less, or 0.30 or less, or 0.20 or less based on the entire block copolymer containing a hydrophilic block and a hydrophobic block. Alternatively, the volume fraction ($f_{hydrophobic}$) of the hydrophobic block may be 0.01 to 0.50, or 0.05 to 0.30, or 0.10 to 0.20 based on the entire block copolymer containing a hydrophilic block and a hydrophobic block.

When the volume fraction ($f_{hydrophobic}$) of the hydrophobic block is greater than 0.50 based on the entire block copolymer containing a hydrophilic block and a hydrophobic block, there is a risk that it does not dissolve well in water, and mixing with the TA solution may not be easy. In addition, when the volume fraction ($f_{hydrophobic}$) of the hydrophobic block is less than 0.01 based on the entire block copolymer containing a hydrophilic block and a hydrophobic block, there is a risk that the cohesive strength of the hydrogel generated when mixed with tannic acid is weakened.

Therefore, the volume fraction of the hydrophobic block in the amphipathic block copolymer can be adjusted to the above range to control the mechanical properties of the adhesive composition containing the same.

Meanwhile, the amphiphilic block copolymer may be in the form of a micelle in aqueous solution. As described above, the amphiphilic block copolymer contains both a hydrophilic block and a hydrophobic block, and the hydrophobic block can form a domain by self-assembly in aqueous solution. In the process of mixing the amphiphilic block copolymer with other components in the adhesive composition, the hydrophilic block are directed outwards and the hydrophobic block is directed in the opposite direction, that is, directed to inside, depending on the difference in affinity of each block for tannic acid, so that it can have a spherical or spherical-like micelle form.

FIG. 4D shows the particle size distribution of the amphiphilic block copolymer micelles obtained by DLS measurement in $H_2O$, and it can be confirmed that all the amphiphilic block copolymers according to an embodiment of the present disclosure form micelles in aqueous solution as will be described later.

Meanwhile, the amphiphilic block copolymer may be in the form of a di-block copolymer having one hydrophilic block and one hydrophobic block. Thereby, there is an advantage of increasing the uniformity between the mixtures in the adhesive composition and increasing the adhesive strength. Meanwhile, in the case of a triblock copolymer form having one hydrophilic block and two hydrophobic blocks, it is difficult to uniformly form a mixture in the adhesive composition, and there is a limit in that the adhesive strength is poor.

According to another embodiment of the disclosure, there can be provided a method for preparing an adhesive composition, comprising the steps of: copolymerizing a hydrophilic polymer and a hydrophobic polymer to form an amphiphilic block copolymer containing a hydrophilic block and a hydrophobic block; adding the amphiphilic block copolymer and tannic acid to water; and stirring the aqueous solution to form a hydrogel.

The contents relating to the amphiphilic block copolymer and the tannic acid includes the contents described above for the one embodiment.

The amphiphilic block copolymer may be formed by copolymerizing a hydrophilic polymer and a hydrophobic polymer.

At this time, the content of the hydrophilic polymer and the hydrophobic polymer can be added by adjusting the volume fraction ($f_{hydrophobic}$) of the hydrophobic block in the formed amphiphilic block copolymer to be 0.01 to 0.50.

Then, the formed amphiphilic block copolymer and tannic acid are added to water to form an aqueous solution, and the aqueous solution can be stirred to form a hydrogel.

When the amphiphilic block copolymer containing the hydrophilic block and the hydrophobic block and tannic acid are mixed within an aqueous solution as described above, a coacervate hydrogel with high adhesive strength is produced, wherein since the hydrogel behaves as a solid phase at 5 to 65° C., the weak tensile and shear strength of the hydrogel applied compared to the liquid phase hydrogel is greatly enhanced, thereby capable of overcoming the limit of deformation easily caused by external stress. Thereby, the cohesive strength, which is an important physical property of the adhesive, can be significantly increased.

Further, the hydrophobic block in the amphiphilic block copolymer can make nanometer-level domains by self-assembly in aqueous solution, and the domain can play a role of supporting the hydrophilic block and the hydrogen bonding network of tannic acid.

Meanwhile, a hydrophilic block whose degree of hydration changes depending on the temperature can be introduced as the hydrophilic block of the amphiphilic block copolymer. As the temperature in water increases, the degree of hydration decreases. By introducing a hydrophilic block in which the chain shrinks, the block copolymer hydrogel containing the hydrophilic block exhibits a gel-sol transition phenomenon that transitions to a liquid phase at a specific temperature or higher.

Therefore, the hydrogen bond between the hydrophilic block and the tannic acid can be aligned by a thermal quenching step of heating the hydrophilic block of the amphiphilic block copolymer to a temperature near the corresponding temperature exhibiting the gel-sol transition phenomenon, and then lowering it to a room temperature again, thereby capable of remarkably improving the mechanical properties.

On the other hand, since a high-temperature liquid state is advantageous for uniformly applying to the surface, it is very useful for increasing the interfacial adhesive stregnth, so that an adhesive having excellent cohesive strength and interfacial adhesive strength at room temperature can be obtained.

The thermal quenching can be continuously performed two or more times, and hydrogen bonding are further locally densified by continuous heating and cooling, and the elastic and viscous characteristics can be amplified to further improve the mechanical properties.

Meanwhile, the hydrophilic block of the amphiphilic block copolymer may be poly(ethylene oxide) (PEO).

Further, the hydrophobic block of the amphipathic block copolymer may be either a polylactide-based polymer or a polylactone-based polymer.

The polylactide-based polymer may include at least one polymer selected from the group consisting of poly(d,l-lactide) and poly(l-lactide). That is, the polylactide-based polymer may include one type of poly(d,l-lactide), one type of poly(l-lactide), or a mixture of two or more thereof. The poly(d,l-lactide) is a homopolymer obtained by homopolymerization of a d,l-lactide monomer, and the poly(l-lactide) is a homopolymer obtained by homopolymerization of l-lactide monomer.

The polylactone-based polymer may include at least one polymer selected from the group consisting of polyvalerolactone and polycaprolactone. That is, the polylactone-based polymer may include one type of polyvalerolactone, one type of polycaprolactone, or a mixture of two or more thereof.

According to another embodiment of the disclosure, there can be provided An adhesive comprising the adhesive composition comprising: an amphiphilic block copolymer containing a hydrophilic block and a hydrophobic block, tannic acid and water.

The adhesive may have high biodegradability and excellent mechanical properties while being biocompatible with a natural product as a main component.

In addition, since the adhesive guarantees biodegradability, it can be applied to disposable articles or medical articles, and can provide a wide range of mechanical properties to realize the adhesiveness suitable for the purpose.

In addition, since the whole is composed of a biocompatible material, it can be quickly decomposed after use to realize an adhesive that is harmless to the environment.

Advantageous Effects

According to the present disclosure, an adhesive composition having high 0 biodegradability and excellent mechanical properties while being biocompatible can be provided.

Also, according to the present disclosure, a method for preparing an adhesive composition having high biodegradability and excellent mechanical properties while being biocompatible can be provided.

In addition, according to the present disclosure, an adhesive comprising the adhesive composition can be provided.

BRIEF DESCRIPTION OF THE DRAWINGS

FIG. 1 shows the formation of an OL/TA hydrogel by mixing an amphiphilic block copolymer (PEO-b-PLA; OL) containing PEO and PLA as hydrophilic and hydrophobic blocks, respectively, and tannic acid (TA).

FIGS. 2(a) to 2(d) shows a state in which the adhesive properties are improved by thermal quenching in the OL/TA hydrogel. FIG. 2A shows a state in which the hydrophilic block of the amphipathic block copolymer in the form of a micelle is packed by TA acting as a binder through hydrogen bond interaction, to form a network. FIG. 2B shows the amphiphilic block copolymer (PEO-b-PLA; OL) and tannic acid (TA) used in Examples, and FIG. 2C shows a state ((OL/TA$^Q$) in which an OL/TA hydrogel is formed by mixing an aqueous solution containing OL and tannic acid (TA), and the mechanical properties are improved by thermal quenching. FIG. 2D shows a state that gives a demonstration of the adhesive strength for OL, OL/TA and OL/TA$^Q$.

FIG. 3A shows the chemical structure and a typical $^1$H NMR spectrum (400 MHz, CDCl$_3$, 20° C.) of PEO-b-PLA (OL), and FIG. 3B shows the SEC of the amphiphilic block copolymers (OL-H, OL-M, OL-L) and PEO of Preparation Examples 1 to 3 (1 mL min$^{-1}$, 0.05 M LiBr, 45° C.).

FIGS. 4(a) to 4(d) show the DLS correlation curves of the amphipathic block copolymers ((A) OL-L, (B) OL-M, (C) OL-H) of Preparation Examples 1 to 3 in an aqueous solution having a concentration of 0.01 wt %, and FIG. 4D shows the particle size distribution of the amphiphilic block copolymer micelles obtained by DLS measurement in H$_2$O.

FIG. 5 shows $^1$H NMR spectra of TA (grey), OL-M (blue) and OL-M/TA (orange) in D$_2$O (400 MHz, 20° C.).

FIG. 6 shows FT-IR spectra of TA (grey), OL-M (blue) and OL-M/TA (orange) and OL-M/TA$^Q$ (green) after thermal quenching 5 times.

FIGS. 7(a) to 7(f) shows the viscoelastic behavior of OLs of Preparation Examples 1 to 3 and OL/TA of Examples 1 to 3 evaluated by dynamic shear measurement in comparison with PEO.

FIGS. 8(a) to 8(h) shows strain amplitude sweeps (A, B, C, D) and frequency sweep (E, F, G, H) data obtained by oscillatory shear measurement of OL/TA according to f$_{PLA}$ fraction (grey: 0, orange: 0.06, blue: 0.13, green: 0.20).

FIGS. 9(a) to 9(h) shows strain amplitude sweep (A, B, C, D) and frequency sweep (E, F, G, H) data obtained by oscillatory shear measurements of OL-M/TA, depending on the ratio of [CH$_2$CH$_2$O]: [TA] ([CH$_2$CH$_2$O]: [TA]=100:0 (grey), 30:1 (orange), 20:1 (blue), 10:1 (green)).

FIGS. 10(a) to 10(c) shows frequency sweep data obtained by oscillatory shear measurement in which the viscoelastic properties of OL-M/TA were measured while increasing the temperature.

FIG. 11A is data showing that the mechanical properties of OL-H/TA are improved by continuous thermal quenching (coefficients obtained at ω=1 rad s$^{-1}$ and γ=0.1% are shown), FIG. 11B is data showing the stability of the material due to thermal quenching at room temperature, and FIG. 11C shows a one-dimensional SAXS profile of OL-H/TA (solid line) compared with OL-H (dotted line).

FIGS. 12(a) to 12(c) is a measurement of the frequency sweep of OL-H/TA that repeats a temperature cycle of 25~85° C. FIGS. 12A and 12B are obtained at 25° C. and 85° C., respectively, and FIG. 12C is the same graph as FIG. 11A.

FIGS. 13(a) to 13(c) is a measurement of the frequency sweep of the OL-M/TA that repeats the temperature cycle of 25~85° C. FIGS. 13A and 13B are obtained at 25° C. and 85° C., respectively, and FIG. 13C is data showing that the mechanical properties of OL-M/TA are improved by continuous thermal quenching. (Coefficients obtained at ω=1 rad s$^{-1}$ and γ=0.1% are shown.)

FIGS. 14(a) to 14(c) is a measurement of the frequency sweep of PEO/TA that repeats the temperature cycle of 25~85° C. FIGS. 14(A) and (B) are obtained at 25° C. and 85° C., respectively, and FIG. 14C is data showing that the mechanical properties of PEO/TA are improved by continuous thermal quenching. (Coefficients obtained at ω=1 rad s$^{-1}$ and γ=0.1% are shown.)

FIG. 15 shows the one-dimensional SAXS profile of the parent polymer solution (50 wt % in aqueous solution, dotted line) and polymer/TA hydrogel (solid line).

FIGS. 16(a) to 16(d) is an evaluation of the adhesive characteristics for the TA-containing hydrogel. It is shown by measuring (A) separation strength and (B) shear strength of poly(ester terephthalate) (PET) substrates of TA-containing hydrogels while varying the volume fraction (f$_{PLA}$) of the hydrophobic block in the OL. FIG. 16C shows the amount of increase in shear strength (ΔShear strength) due to the repetition of the temperature cycle of 25 to 85° C., and FIG. 16D shows a state of demonstrating the increase of the adhesive strength for OL-H/TA and OL/TA$^Q$ due to the repetition of the temperature cycle.

DETAILED DESCRIPTION OF THE EMBODIMENTS

Hereinafter, the present disclosure will be described in more detail with reference to examples. However, the following examples are for illustrative purposes only, and are not intended to limit the subject matter of the present disclosure.

Unless otherwise noted, chemicals were used as purchased.

1,8-Diaza-bicyclo [5.4.0]undec-7-ene (DBU), tannic acid, 1,5,7-triazabicyclo[4,4,0]dec-5-ene (TBD), acetonitrile, and polyethylene oxide was purchased from Sigma-Aldrich (St. Louis, MO, USA). d,l-Lactide was provided by Corbion Purac (Amsterdam, Netherlands), and recrystallized from ethyl acetate and stored in a glove box. Delta-valerolactone and epsilon-caprolactone were purchased from TCI. Benzoic acid was purchased from DaeJung Chemicals (Siheung, South Korea), HPLC grade dichloromethane was purchased from Burdick & Jackson (Morristown, NJ, ISA) and purified using a solvent purification system (C&T International, Suwon, South Korea).

PREPARATION EXAMPLE

Three PEO-b-PLAs of Preparation Examples 1 to 3 were prepared as an amphiphilic block copolymer containing a hydrophilic block and a hydrophobic block, and represented by OL-L, OL-M and OL-H, respectively, The poly(d,l-lactide)[PLA] volume fractions (0.06, 0.13 and 0.20, respectively) were represented by OL-L, OL-M and OL-H, respectively, according to the volume fraction of poly(d,l-lactide)[PLA] (0.06, 0.13 and 0.20, respectively).

Preparation Example 1: Synthesis of OL-H (PLA Volume Fraction 0.20)

A polymerization mixture containing PEO-OH (2.0000 g, 0.1 mmol) and d,l-lactide (0.7208 g, 10 mmol) in 20 ml of dichloromethane (DCM) was prepared in a glove box. A solution containing DCM (0.1 ml) and DBU (0.000011 g, 0.000069 mmol) was added to a reaction flask and stirred at room temperature. After stirring for 8 minutes, benzoic acid (0.0084 g, 0.00138 mmol) was added to terminate the polymerization. The product was purified by dialysis with methanol (MeOH) at ambient conditions for 24 hours. The resulting amphiphilic block copolymer (OL-H) was collected and dried overnight under vacuum at 40° C. prior to $^1$H NMR and SEC analysis.

Preparation Example 2: Synthesis of OL-M (PLA Volume Fraction 0.13)

An amphiphilic block copolymer (OL-M) was prepared in the same manner as in Preparation Example 1, except that PEO-OH (3.0000 g, 0.15 mmol) and d,l-Lactide (0.8648 g, 12 mmol) were used.

Preparation Example 3: Synthesis of OL-L (PLA Volume Fraction 0.06)

An amphipathic block copolymer (OL-L) was prepared in the same manner as in Preparation Example 1, except that PEO-OH (3.0000 g, 0.15 mmol) and d,l-Lactide were used at 0.3243 g and 4.5 mmol.

As an amphiphilic block copolymer comprising a hydrophilic block and a hydrophobic block, PEO-b-PLLA of Preparation Example 4, PEO-b-PVL of Preparation Example 5, and PEO-b-PCL of Preparation Example 6 were prepared, and represented by OL-LL, OL-V and OL-C, respectively.

Preparation Example 4: Synthesis of OL-LL (poly(l-lactide)[PLLA] Volume Fraction 0.18)

An amphipathic block copolymer (OL-LL) was prepared in the same manner as in Preparation Example 1, except that PEO-OH (3.0000 g, 0.15 mmol) and l-lactide (0.8648 g, 12.0 mmol) were used.

Preparation Example 5: Synthesis of OL-V (Polyvalerolactone [PVL] Volume Fraction 0.35)

A polymerization mixture containing PEO-OH (1.0000 g, 0.1 mmol) and delta-valerolactone (0.4005 g, 4 mmol) in 3.0 ml of acetonitrile was prepared in a glove box. A solution containing TBD (0.0278 g, 0.20 mmol) was added to a reaction flask and stirred at room temperature. After stirring for 1 hour, acetic acid (0.024 g, 0.4 mmol) was added to terminate the polymerization. The product was purified by precipitation in hexane at ambient conditions for 24 hours. The resulting amphiphilic block copolymer (OL-V) was collected and dried overnight under vacuum at 40° C. prior to $^1$H NMR and SEC analysis.

Preparation Example 6: Synthesis of OL-C (polycaprolactone [PCL] Volume Fraction 0.25)

An amphipathic block copolymer (OL-C) was prepared in the same manner as in Preparation Example 5, except that PEO-OH (2.0000 g, 0.2 mmol), epsilon-caprolactone (0.6848 g, 6 mmol), and acetonitrile (3.5 ml) were used.

Example 1: Preparation of OL-H/TA Hydrogel

OL-H (0.2030 g, 0.00796 mmol) and TA (0.3134 g, 0.1842 mmol, 5.1 mol % relative to PEO repeating unit) prepared in Preparation Example 1 were dissolved in deionized water at 60° C. to prepare an amphiphilic block copolymer (OL-H) and TA 50 wt % aqueous solution.

TA aqueous solution was added to OL-H aqueous solution, and then mixed with a spatula and stirred overnight to prepare a mixture.

A light brown mixture was precipitated on the bottom by using a 5000G high-capacity centrifuge Combi R514R (Hanil Inc., Daejeon, Korea) for 15 minutes.

Example 2: Preparation of OL-M/TA Hydrogel

An OL-M/TA hydrogel was prepared in the same manner as in Example 1, except that OL-M (0.1999 g, 0.0086 mmol) and TA (0.3319 g, 0.1951 mmol, 5.0 mol % relative to PEO repeat units) were used.

Example 3: Preparation of OL-L/TA Hydrogel

An OL-L/TA hydrogel was prepared in the same manner as in Example 1, except that OL-L (0.2004 g, 0.0094 mmol) and TA (0.3606 g, 0.2117 mmol, 5.0 mol % relative to PEO repeat units) were used.

Example 4: Preparation of OL-LL/TA Hydrogel

An OL-LL/TA hydrogel was prepared in the same manner as in Example 1, except that OL-LL (0.1 g, 0.0040 mmol) and TA (0.1553 g, 0.0913 mmol, 5 mol % relative to PEO repeat units) were used.

Example 5: Preparation of OL-V/TA Hydrogel

An OL-V/TA hydrogel was prepared in the same manner as in Example 1, except that OL-V (0.1 g, 0.0066 mmol) and TA (0.1272 g, 0.0748 mmol, 5 mol % relative to PEO repeat units) were used.

Example 6: Preparation of OL-C/TA Hydrogel

An OL-C/TA hydrogel was prepared in the same manner as in Example 1, except that OL-C (0.1 g, 0.0075 mmol) and TA (0.1443 g, 0.0848 mmol, 5 mol % relative to PEO repeat units) were used.

Comparative Example 1: Preparation of PEO/TA

PEO/TA was prepared in the same manner as in Example 1, except that PEO (0.2020 g, 0.0101 mmol) and TA (0.3863 g, 0.2271 mmol, 5.0 mol % relative to PEO repeat units) were used.

EXPERIMENTAL EXAMPLE (1) $^1$H NMR: $^1$H nuclear magnetic resonance (NMR) was obtained by using the residual NMR solvent signal as an internal reference using a Bruker Avance 400 MHz spectrometer (Billerica, MA, USA).

(2) Size exclusion chromatography (SEC): performed in a 0.05 M LiBr N,N-dimethylformamide (DMF) solution at 40° C. at a flow rate of 1 mL min$^{-1}$ in an Agilent 1260 infinity system (Santa Clara, CA, USA). In the instrument, a 1260 refractive index detector, one PSS GRAM analysis 100 Å column with a molar mass range of 300-60,000 g mol$^{-1}$, and w to PSS GRAM analysis 10,000 Å column with a molar mass range of 10,000-50,000,000 g mol$^{-1}$ were mounted in series.

(3) The molar mass of the polymer was calculated for a linear polystyrene standard obtained from Agilent Technologies.

(4) Fourier transform infrared (FTIR) spectra were obtained with a Bruker Alpha FTIR spectrometer using a platinum attenuated total reflection (ATR) single reflection module.

(5) Dynamic light scattering (DLS) measurements were performed at a wavelength of 658 nm with a scattering angle of 90° using a Brookhaven 90Plus/BI-MAS particle size analyzer (Holtsville, NY).

(6) Synchrotron small-angle X-ray scattering (SAXS) experiments were carried out at the 9A beamline of the Pohang Accelerator Laboratory (PAL).

A 20.01 keV monochromatic X-ray radiation source with a distance of 6.455 m from the sample to the detector was used, and the scattering intensity was monitored by a Mar 165 mm diameter CCD detector with 2048×2048 pixels.

The two-dimensional scattering pattern was integrated into azimuth to provide a one-dimensional profile represented by the scattering vector (q) versus the scattering 0 intensity. Here, the magnitude of the scattering vector was calculated as $q=4\pi/\lambda \sin\theta$.

The domain spacing (d) was estimated at the major peak positions of q* according to the relationship $d=2/q*$.

(7) The rheological properties of the hydrogel were measured using an Anton Paar rheometer model MCR 302 (Graz, Austria) having parallel plate geometry.

The volume of the loaded sample was 0.8 mL, and the spacing between the plates was 0.5 mm.

Two different modes of oscillatory shear rheology were applied to identify the rheological properties of hydrogels, such as frequency sweep mode and amplitude sweep mode.

In the frequency sweep mode, the shear modulus was measured at a fixed strain amplitude (0.1%) with various angular frequencies from 0.1 to 100 rad s$^{-1}$.

In the amplitude sweep mode, the shear modulus at a fixed frequency (10 rad s$^{-1}$) was measured with a strain amplitude in the range of 0.01% to 100% (0.0001 to 1).

1. Confirmation of Formation of Amphiphilic Block Copolymer

FIG. 3A shows the chemical structure and a typical $^1$H NMR spectrum (400 MHz, CDCl$_3$, 20° C.) of PEO-b-PLA (OL), and FIG. 3B shows the SEC of the amphiphilic block copolymers (OL-H, OL-M, OL-L) and PEO of Preparation Examples 1 to 3 (1 mL min$^{-1}$, 0.05 M LiBr, 45° C.).

Table 1 below shows the molar mass and hydrodynamic diameter (Dh) of the amphipathic block copolymers (OL-H, OL-M, OL-L) of Preparation Examples 1 to 3.

TABLE 1

| | $M_{n,PEO}$ (kg mol$^{-1}$) | $M_{n,PLA}$ (kg mol$^{-1}$) | $M_{n,SEC}$ (kg mol$^{-1}$) | Đ | $f_{PLA}$ | $D_{h, H2O}$ (nm) |
|---|---|---|---|---|---|---|
| PEO | 20 | — | 39.5 | 1.23 | 0 | — |
| OL-L | 20 | 1.4 | 39.9 | 1.19 | 0.06 | 228.2 |
| OL-M | 20 | 3.2 | 43.7 | 1.16 | 0.13 | 180.6 |
| OL-H | 20 | 5.5 | 47.4 | 1.15 | 0.20 | 141.0 |

According to FIGS. 3(a) to 3(b) and Table 1, it can be confirmed that in accordance with Preparation Example 3, an amphiphilic block copolymer having a narrow dispersion of 1.15 level and a controlled molecular weight of 25.5 kg mol$^{-1}$ was synthesized, and it can be seen that the block copolymer forms a micelle structure with a size of 141 nm during aqueous solution conditions.

FIGS. 4(a) to 4(c) show the DLS correlation curves of the amphipathic block copolymers ((A) OL-L, (B) OL-M, (C) OL-H) of Preparation Examples 1 to 3 in an aqueous solution having a concentration of 0.01 wt %, and FIG. 4D shows the particle size distribution of the amphiphilic block copolymer micelles obtained by DLS measurement in H$_2$O.

FIG. 5 shows $^1$H NMR spectra of TA (grey), OL-M (blue) and OL-M/TA (orange) in D$_2$O (400 MHz, 20° C.).

According to FIGS. 4(a) to 4(d), it can be confirmed that all the amphiphilic block copolymers of Preparation Examples 1 to 3 form micelles in aqueous solution. According to FIG. 5, from the fact that the signal of the ether proton of the PEO block indicated at 3.6 ppm of the $^1$H NMR spectrum of OL-M and the signal of the benzene ring indicated in the region of 6.3-7.8 ppm of TA are not observed in OL-M/TA, it can be confirmed that the amphiphilic block copolymer and TA interact through hydrogen bonding.

FIG. 6 shows FT-IR spectra of TA (grey), OL-M (blue) and OL-M/TA (orange) and OL-M/TA$^Q$ (green) after thermal quenching 5 times.

In FIG. 6, it can be confirmed that hydrogen bonds are formed by shafting the C-O-C stretching oscillation band shifts to a lower wavenumber.

2. Dynamic Shear Measurement

FIGS. 7(a) to 7(f) shows the viscoelastic behavior of OLs of Preparation Examples 1 to 3 and OL/TA of Examples 1 to 3 evaluated by dynamic shear measurement in 5 comparison with PEO.

A 50 wt % aqueous solution of PEO and OL-L at room temperature was a liquid exhibiting a very low storage modulus (G') less than 10 Pa and could not be accurately measured (FIGS. 7A and 7B), but it can be confirmed that OL-M and OL-H formed hydrogels having G' of 10 and 20 kPa (FIGS. 7C and 7D).

Further, a stable phase of G' higher than the loss factor (G") is observed in the entire angular frequency (ω) range investigated, which is consistent with the network structure formed by the packing of OL micelles that provides an elastic response. From this, it can be confirmed that the hydrophobic microdomains formed by self-assembly of the amphiphilic block copolymer support the hydrogen bonding network of the hydrophilic block and tannic acid to enable the behavior to the solid phase.

Meanwhile, TA makes the solution viscous upon addition, and PEO/TA and OL-L/TA have a clear power law dependence of G" to ω, whereas G' did not follow the $\omega^2$ scaling commonly observed in viscous fluids.

G' and G" of the OL-M/TA and OL-H/TA hydrogels also increased with increasing frequency, and the slopes of G' and G" became nearly 0.5 in the high-frequency region. This is consistent with the sticky Rouse model that describes the associated polymer network. From this, it can be confirmed that TA acts as a molecular adhesive that connects polymer chains through hydrogen bonds within the network, and the hydrophobic domain form a network structure that is connected by the interaction of the hydrophilic block with TA.

Moreover, the viscoelastic properties of OL/TA can be easily controlled by the PLA content. According to FIG. 7E, G' increases as the volume fraction of PLA increases, and G' was observed to be 900 times higher in OL-H/TA than in PEO/TA.

FIGS. 8(a) to 8(h) shows strain amplitude sweeps (A, B, C, D) and frequency 0 sweep (E, F, G, H) data obtained by oscillatory shear measurement of OL/TA according to $f_{PLA}$ fraction (grey: 0, orange: 0.06, blue: 0.13, green: 0.20). According to FIG. 7E and FIGS. 8(a) to 8(h), it can be confirmed that the PLA fraction is increased through the intersection between G' and G" appearing at higher strains in the amplitude sweep, and thus exhibits solid-like properties even at relatively high strains, so that the stability of the network against deformation is also improved.

FIGS. 9(a) to 9(h) shows strain amplitude sweep (A, B, C, D) and frequency sweep (E, F, G, H) data obtained by oscillatory shear measurements of OL-M/TA, depending on the ratio of [CH$_2$CH$_2$O]:[TA] ([CH$_2$CH$_2$O]:[TA]=100:0 (grey), 30:1 (orange), 20:1 (blue), 10:1 (green)).

According to FIG. 7F and FIGS. 9(a) to 9(h), it can be confirmed the effect of the amount of TA on the rheological characteristics of OL-M/TA. In FIGS. 9(a) to 9(h), it can be confirmed that G' and G" increase as the ratio of [CH$_2$CH$_2$O]:[TA] increases from 100:0 to 20:1. From the tendency that G" still increases but G' decreases with increasing to 10:1, it can be confirmed that there is an appropriate ratio that can maximize the solid-like properties of the network structure. Further, from the fact that the intersection of G' and G" moves at a low strain rate, it can be confirmed that the network structure becomes vulnerable to deformation as the amount of TA increases.

3. Heat-Treated Strengthening of Hydrogel

Meanwhile, the dynamic modulus of OL/TA hydrogels can be significantly improved by heat-treated strengthening.

FIGS. 10(a) to 10(c) shows frequency sweep data obtained by oscillatory shear measurement in which the viscoelastic properties of OL-M/TA were measured while increasing the temperature.

According to FIGS. 10(a) to 10(c), when oscillating shear measurement was carried out at intervals of 10° C. from 15° C. at a temperature increase rate of 20° C. min$^{-1}$ for OL-M/TA, it can be confirmed that G' and G" show a tendency to decrease up to 65° C., and G" tends to slightly increase at 75° C. This means that it is close to the gel-sol transition temperature of OL-M/TA. After that, at 85° C., it can be seen that G' and G" intersect and exhibit liquid-like properties.

FIG. 11A is data showing that the mechanical properties of OL-H/TA are improved by continuous thermal quenching (coefficients obtained at ω=1 rad s$^{-1}$ and γ=0.1% are shown), FIG. 11B is data showing the stability of the material due to thermal quenching at room temperature, and FIG. 11C shows a one-dimensional SAXS profile of OL-H/TA (solid line) compared with OL-H (dotted line).

FIGS. 12(a) to 12(c) is a measurement of the frequency sweep of OL-H/TA that repeats a temperature cycle of 25~85° C. FIGS. 12A and 12B are obtained at 25° C. and 85° C., respectively, and FIG. 12C is the same graph as FIG. 11A.

According to FIGS. 11(a) to 11(c) and FIGS. 12(a) to 12(c), the phase separation material behaved like a liquid having G' of 30 Pa at 85° C. When cooled to room temperature at a cooling rate of 20 min$^{-1}$, the hydrogel state was restored and the released water was adsorbed again. Surprisingly, G' and G' increased about 10-fold compared to the hydrogel produced without heating. It was observed that the physical properties were further improved by repeating the continuous thermal quenching up to 5 times, and G' increased 100-fold to achieve the 1 MPa level. The cured material can be obtained simply by cooling the heated hydrogel in air at room temperature and annealing for a few minutes (represented by OL-H/TA$^Q$).

FIGS. 13(a) to 13(c) and FIGS. 14(a) to 14(c) are the measurement of the frequency sweep of the OL-M/TA and PEO/TA that repeats the temperature cycle of 25~85° C. FIGS. 13(a) to 13(c) and FIGS. 14A and 14B are obtained at 25° C. and 85° C., respectively, and FIG. 14C is data showing that the mechanical properties of OL-M/TA are improved by continuous thermal quenching. (Coefficients obtained at ω=1 rad s$^{-1}$ and γ=0.1% are shown.)

According to FIGS. 13(a) to 13(c) and FIGS. 14(a) to 14(c), it can be confirmed that the enhancement of mechanical properties by thermal quenching is observed even in OL-M/TA and PEO/TA, and thus, the phenomenon is clearly associated with PEO-TA interaction. However, according to FIG. 11B, it was confirmed that the improved characteristics of PEO/TA$^Q$ lasted only temporarily and return to liquid after about 2 hours at room temperature. Meanwhile, it can be seen that the value of OL-H/TA$^Q$ also decreases with the passage of time, but it can be seen that the rate is much slower, and in the case of OL-H/TA$^Q$, the hydrogel state is successfully maintained over a long period of time.

4. Small Angle X-Ray Scattering (SAXS) Experiment

In order to understand how heat treatment affects mechanical properties, the nanostructure of OL/TA was investigated by small-angle X-ray scattering (SAXS).

FIG. 15 shows the one-dimensional SAXS profile of the parent polymer solution (50 wt % in aqueous solution, dotted line) and polymer/TA hydrogel (solid line).

At a concentration of 50 wt %, OL-L and OL-M exhibited broad scattering peaks with weak intensity due to the low PLA fraction in the total solution. A broad main scattering peak was clearly identified in OL-H which proposes disordered micelle packing at a distance between micelles (dm) of 28 nm.

In addition to scattering from micellar structures, a small peak is observed in the higher q region in all samples (0.31-0.37 nm$^{-1}$). This is presumed that the hydrophilic PEO block with limited motion is observed while being aggregated within the micelle network.

The SAXS data of OL-H and OL-H/TA due to the temperature change process are shown in FIG. 11C. Depending on the location of the main scattering peaks, it can be confirmed that the network expanded slightly by as much as 9% in the presence of TA. It is confirmed that when heated to 85° C., the scattering intensity of OL-H and OL-H/TA becomes stronger and narrower, but this is presumed to be because not only the hydrophilic block contracts at that temperature, but also the fluidity of micelle increases and the micelle network structure is rearranged.

increased as the number of heat treatments increased, and that the maximum lifting weight after 5 heat treatment is 3000 g and the strength was increased by 6 times compared to OL-M/TA (500 g) before thermal quenching.

In addition, for OL-M/TA of Example 2, OL-LL/TA of Example 4, OL-V/TA of Example 5, OL-C/TA of Example 6, and PEO/TA of Comparative Example 1, the material was applied between two glass slides, and a weight of 200 g was lifted from the bottom, and the time taken to fall to the bottom of the weight was measured and recorded in Table 2 below.

TABLE 2

| Category | Example 2 | Example 4 | Example 5 | Example 6 | Comparative Example 1 |
|---|---|---|---|---|---|
| Amphiphilic block copolymer | Preparation Example 2 PEO-b-PLA | Preparation Example 4 PEO-b-PLLA | Preparation Example 5 PEO-b-PVL | Preparation Example 6 PEO-b-PCL | PEO |
| Adhesiveness | 15 sec | 48 sec | 10 sec | 34 sec | Less than 10 sec |

It is confirmed that the scattering pattern changed in this way is maintained even after cooling. This appears to be a phenomenon in which the hydrogen bond between the hydrophilic block and the TA is restored during the cooling process, and the ordered structure is maintained, which is considered to improve the mechanical properties of the micelle network structure.

5. Evaluation of Adhesive Characteristics

FIGS. 16(a) to 16(d) is an evaluation of the adhesive characteristics for the TA-containing hydrogel. It is shown by measuring (A) separation strength and (B) shear strength of poly(ester terephthalate) (PET) substrates of TA-containing hydrogels while varying the volume fraction ($f_{PLA}$) of the hydrophobic block in the OL.

FIGS. 16(a) to 16(d) is an evaluation of the adhesive characteristics for the TA-containing hydrogel. The (A) separation strength and (B) shear strength of poly(ester terephthalate) (PET) substrates of TA-containing hydrogels were measured while varying the volume fraction ($f_{PLA}$) of the hydrophobic block in the OL.

FIG. 16C shows the amount of increase in shear strength (ΔShear strength) due to the repetition of the temperature cycle of 25 to 85° C., and FIG. 16D shows a state of demonstrating the increase of the adhesive strength for OL-H/TA and OL/TA$^Q$ due to the repetition of the temperature cycle.

It was confirmed that OL-TA behaved as a biocompatible and environmentally friendly hydrogel adhesive, and particularly, OL-M/TA and OL-H/TA behaved as adhesives with excellent separation and shear strength. In addition, when a thermal quenching step was performed through FIG. 16C, it was confirmed that the adhesive strength of OL-M/TA was further improved. The shear strength improved to over 400 kPa after the first thermal quenching, and the intensity was further improved through repeated thermal quenching, but the destruction occurred on the PET substrate, not the TA-containing hydrogel, and the exact value could not be measured.

It was demonstrated with OL-M/TA of Example 2, and the maximum lifting weight was measured by applying the material between two glass slides and lifting the dumbbells. Thereby, it was confirmed that the maximum weight As a result, it was confirmed that in the case of Examples, the bonding time of the weight was increased as compared with Comparative Examples, and that the bonding strength was increased thereby.

The invention claimed is:

1. An adhesive composition comprising: an amphiphilic block copolymer containing a hydrophilic block and a hydrophobic block, tannic acid and water.

2. The adhesive composition according to claim 1, wherein:
   the hydrophilic block of the amphiphilic block copolymer forms a hydrogen bond with tannic acid.

3. The adhesive composition according to claim 1, wherein:
   the hydrophilic block of the amphiphilic block copolymer exhibits a gel-sol transition behavior depending on the temperature.

4. The adhesive composition according to claim 1, wherein:
   the hydrophobic block of the amphiphilic block copolymer forms domains by self-assembly in an aqueous solution.

5. The adhesive composition according to claim 1, wherein:
   the hydrophilic block of the amphiphilic block copolymer is poly(ethylene oxide).

6. The adhesive composition according to claim 1, wherein:
   the hydrophobic block of the amphiphilic block copolymer is either a polylactide-based polymer or a polylactone-based polymer.

7. The adhesive composition according to claim 6, wherein:
   the polylactide-based polymer includes at least one polymer selected from the group consisting of poly(d,l-lactide) and poly(l-lactide).

8. The adhesive composition according to claim 6, wherein:
   the polylactone-based polymer includes at least one polymer selected from the group consisting of polyvalerolactone and polycaprolactone.

9. The adhesive composition according to claim 1, wherein:
the tannic acid is contained in an amount of 0.5 mol % to 20 mol % with respect to the hydrophilic block repeating unit in the amphiphilic block copolymer.

10. The adhesive composition according to claim 1, wherein:
the volume fraction of the hydrophobic block in the amphiphilic block copolymer is 0.01 to 0.50.

11. The adhesive composition according to claim 1, wherein:
the amphiphilic block copolymer is in the form of a micelle in aqueous solution.

12. The adhesive composition according to claim 1, wherein:
the amphiphilic block copolymer is in the form of a di-block copolymer having one hydrophilic block and one hydrophobic block.

13. A method for preparing an adhesive composition, comprising the steps of:
copolymerizing a hydrophilic polymer and a hydrophobic polymer to form an amphiphilic block copolymer containing a hydrophilic block and a hydrophobic block;
adding the amphiphilic block copolymer and tannic acid to water; and
stirring the aqueous solution to form a hydrogel.

14. The method for preparing an adhesive composition according to claim 13, wherein:
the hydrophilic block of the amphiphilic block copolymer exhibits a gel-sol transition behavior depending on the temperature.

15. The method for preparing an adhesive composition according to claim 13, further comprising:
a thermal quenching step of heating and cooling the aqueous solution to a temperature near a transition temperature.

16. The method for preparing an adhesive composition according to claim 15, wherein:
the thermal quenching step is continuously performed two or more times.

17. The method for preparing an adhesive composition according to claim 13, wherein:
the hydrogel is a solid phase at 5° C. to 65° C.

18. An adhesive comprising the composition according to claim 1.

* * * * *